(12) United States Patent
Moheimani et al.

(10) Patent No.: US 10,495,665 B2
(45) Date of Patent: Dec. 3, 2019

(54) METHODS, DEVICES AND SYSTEMS FOR SCANNING TUNNELING MICROSCOPY CONTROL SYSTEM DESIGN

(71) Applicants: Seyed Omid Reza Moheimani, Allen, TX (US); Farid Tajaddodianfar, Dallas, TX (US); Ehud Fuchs, Plano, TX (US); John Randall, Richardson, TX (US); Joshua Ballard, Richardson, TX (US); James Owen, Garland, TX (US)

(72) Inventors: Seyed Omid Reza Moheimani, Allen, TX (US); Farid Tajaddodianfar, Dallas, TX (US); Ehud Fuchs, Plano, TX (US); John Randall, Richardson, TX (US); Joshua Ballard, Richardson, TX (US); James Owen, Garland, TX (US)

(73) Assignees: Zyvex Labs, LLC, Richardson, TX (US); Texas and Board of Regents, The University of Texas System, Austin, TX (US)

( * ) Notice: Subject to any disclaimer, the term of this patent is extended or adjusted under 35 U.S.C. 154(b) by 112 days.

(21) Appl. No.: 15/707,738

(22) Filed: Sep. 18, 2017

(65) Prior Publication Data

US 2018/0100875 A1 Apr. 12, 2018

Related U.S. Application Data

(60) Provisional application No. 62/396,709, filed on Sep. 19, 2016.

(51) Int. Cl.
*G01Q 10/06* (2010.01)
*G01Q 60/10* (2010.01)
(Continued)

(52) U.S. Cl.
CPC .......... *G01Q 10/065* (2013.01); *G01Q 60/10* (2013.01); *G05D 3/1409* (2013.01);
(Continued)

(58) Field of Classification Search
CPC ...... G01Q 10/06; G01Q 10/065; G01Q 60/04; G01Q 60/10; G05B 19/00; G05D 3/1409; G05D 3/1454; G05D 3/1463
See application file for complete search history.

(56) References Cited

U.S. PATENT DOCUMENTS 4,343,993 A * 8/1982 Binnig ................... B82Y 35/00
250/423 F
5,036,196 A * 7/1991 Hosaka .................. B82Y 35/00
250/423 F
(Continued)

FOREIGN PATENT DOCUMENTS

WO WO-2007001347 1/2007
WO WO-2013051094 11/2013

OTHER PUBLICATIONS

J.W. Lyding et al., "Variable-temperature scanning tunneling microscope," Rev. Sci. Instrum., vol. 59, No. 9, pp. 1897-1902, 1988.

*Primary Examiner* — David E Smith
(74) *Attorney, Agent, or Firm* — Haynes and Boone, LLP

(57) ABSTRACT

Methods, devices, and systems for controlling a scanning tunneling microscope system are provided. In some embodiments, the methods, devices, and systems of the present disclosure utilize a control system included in or added to a scanning tunneling microscope (STM) to receive data characterizing a tunneling current between a tip of the scanning tunneling microscope system and a sample, to estimate, in real-time, a work function associated with the scanning tunneling microscope system, and to adjust, by a control
(Continued)

system, a position of the tip based on an estimated work function. Associated systems are described herein.

29 Claims, 21 Drawing Sheets

(51) Int. Cl.
  *G05D 3/14* (2006.01)
  *G05B 19/042* (2006.01)
(52) U.S. Cl.
  CPC ......... *G05D 3/1454* (2013.01); *G05D 3/1463* (2013.01); *G05B 19/042* (2013.01); *G05B 2219/45182* (2013.01)

(56) References Cited

U.S. PATENT DOCUMENTS

| | | | | |
|---|---|---|---|---|
| 5,066,858 A | * | 11/1991 | Elings | G01Q 30/06 250/306 |
| 5,168,159 A | * | 12/1992 | Yagi | B82Y 35/00 250/307 |
| 5,338,932 A | * | 8/1994 | Theodore | B82Y 35/00 250/307 |
| 9,329,201 B2 | | 5/2016 | Randall et al. | |
| 2009/0300805 A1 | | 12/2009 | Charra | |
| 2010/0018843 A1 | | 1/2010 | Aimi | |

* cited by examiner

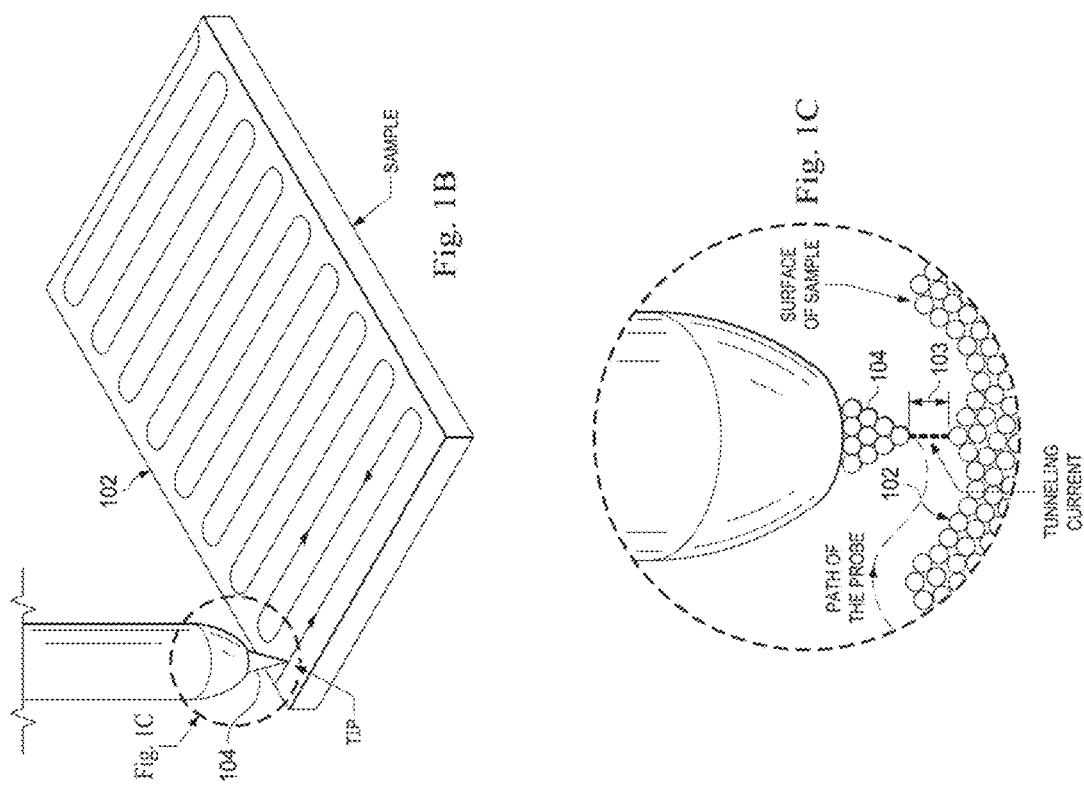

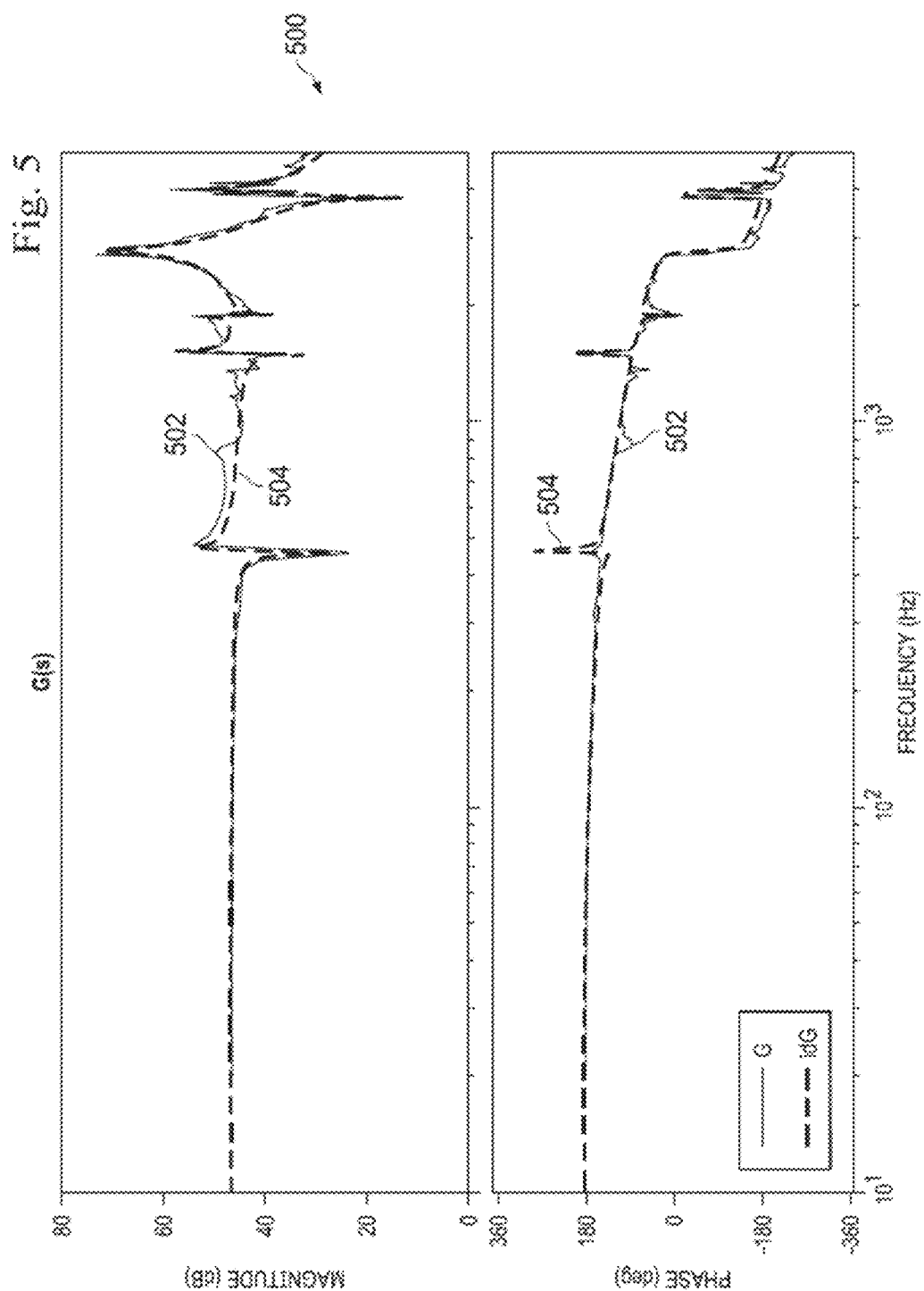

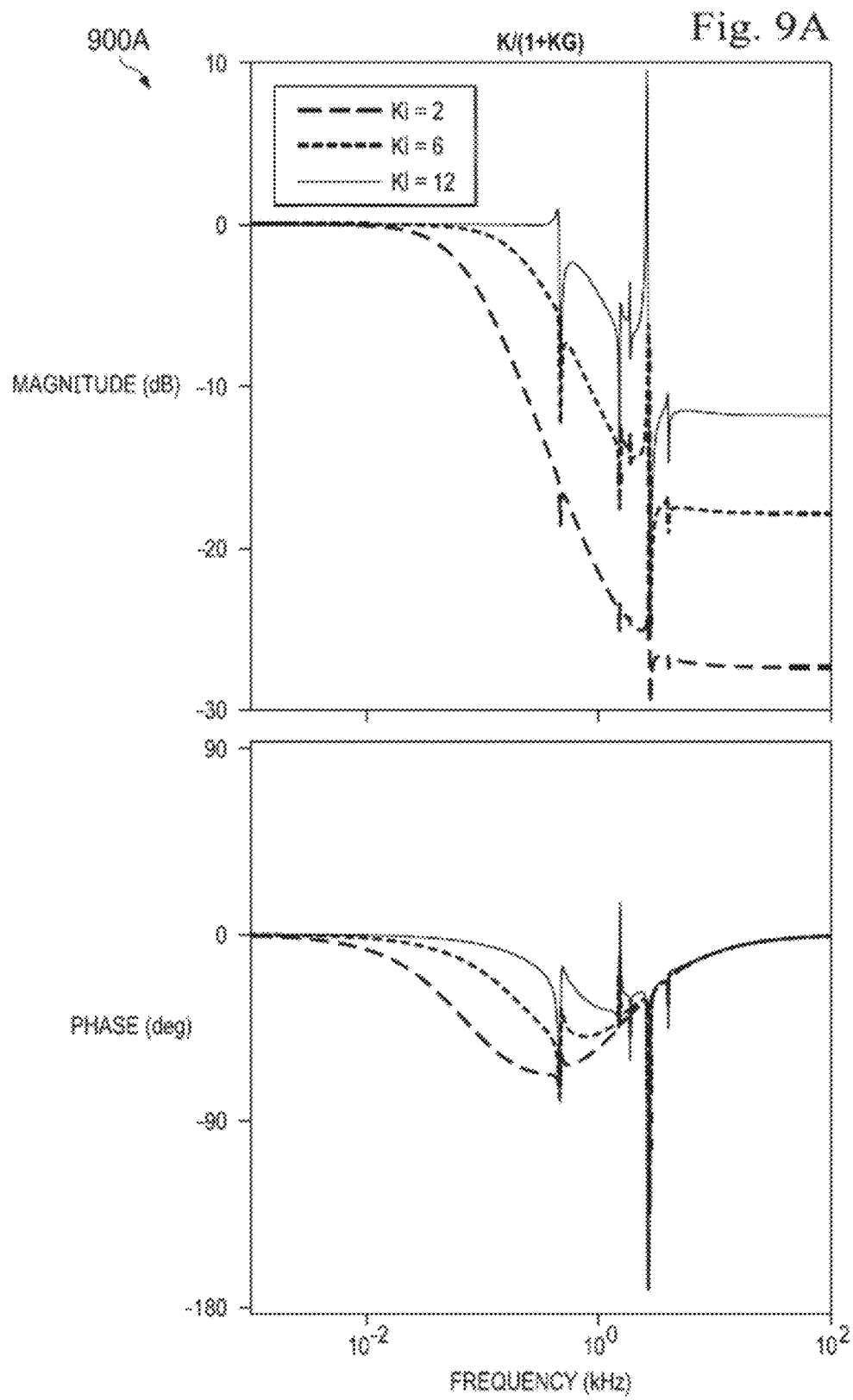

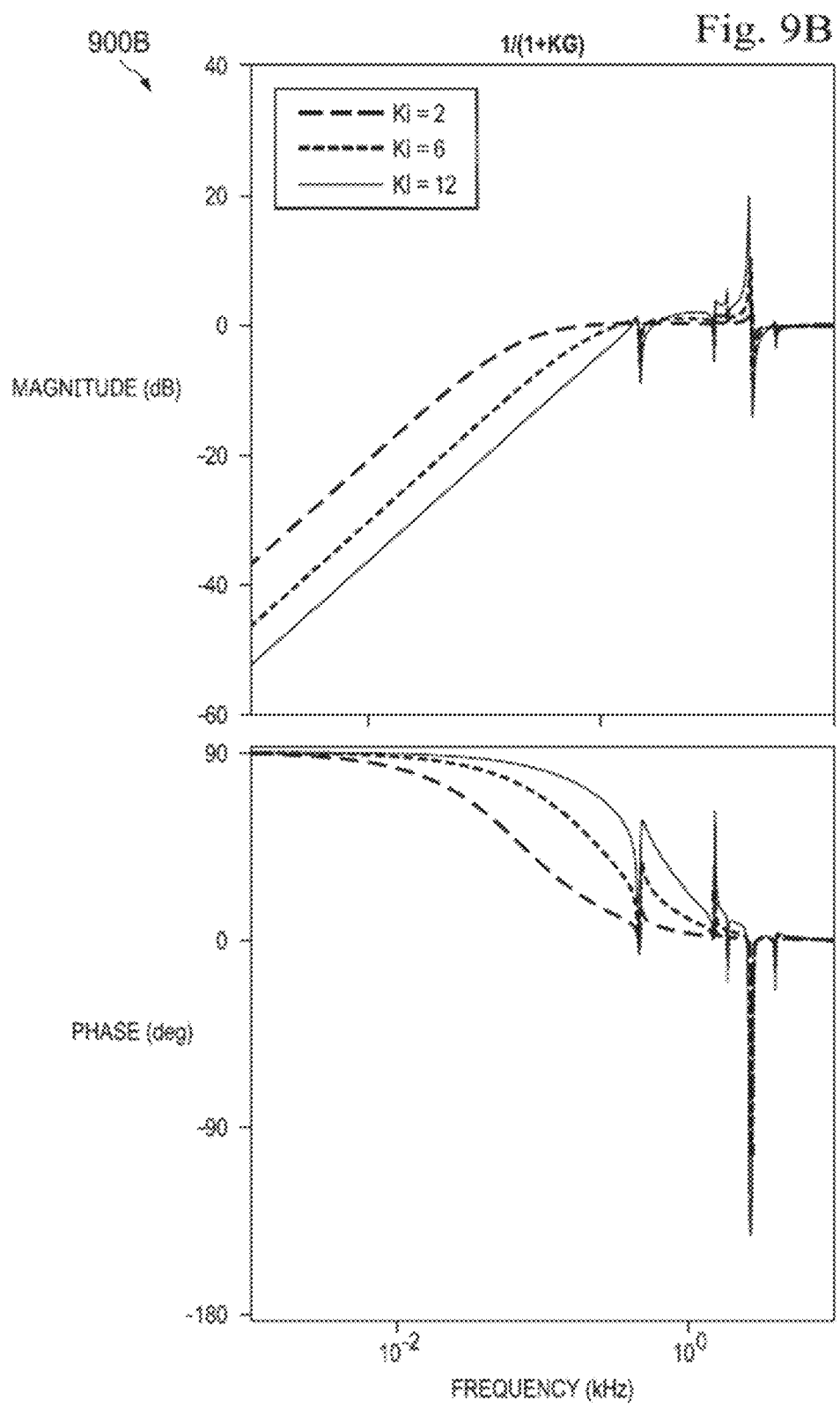

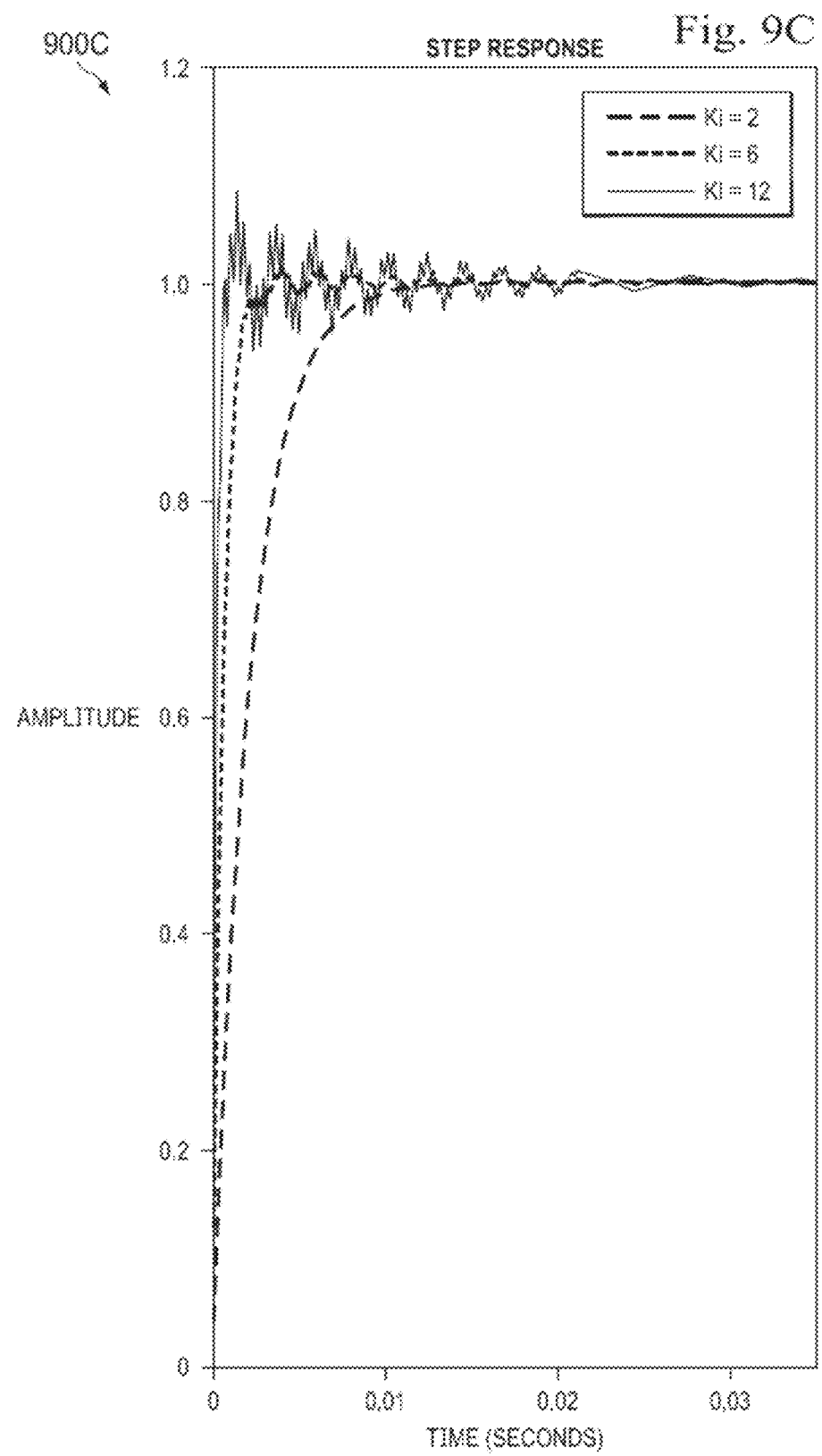

METHODS, DEVICES AND SYSTEMS FOR SCANNING TUNNELING MICROSCOPY CONTROL SYSTEM DESIGN

CROSS-REFERENCE TO RELATED APPLICATIONS

This application claims the benefit of U.S. Provisional Application No. 62/396,709, filed Sep. 19, 2016, titled "Methods, Devices, and Systems for Scanning Tunneling Microscopy Control System Design", the entire disclosure of which is incorporated herein by reference.

STATEMENT OF GOVERNMENTAL INTEREST

This invention was made with government support under Contract Number FA8650-15-C-7542 awarded by the Air Force Research Laboratory (AFRL). The government has certain rights in this invention.

TECHNICAL FIELD

The present disclosure relates to methods, devices, and systems for forming atomically precise structures and for imaging surfaces with atomic precision. In some embodiments, the methods, devices, and systems of the present disclosure provide a control system to improve utilization of a scanning tunneling microscope (STM) to interact with a target surface to characterize the surface and/or to form the atomically precise structures.

BACKGROUND

The ability to image surfaces at atomically precise levels stems from the capabilities of the STM. While there have been many different implementations since its invention in 1982, the fundamental operating principle of an STM is as follows. A conducting tip—tungsten or platinum-iridium—is prepared so as to have a nanoscopic portion of the tip that allows electrons to tunnel to or from the tip and a sample. The tip is brought in close proximity (e.g., within a few nm) to a surface of a sample. Due to the principle of quantum electron tunneling, a current flows across the gap between tip and the sample when a bias voltage is applied between the tip and the sample. The bias voltage applied between the tip and the sample can be either polarity. If the sample is negatively biased with respect to the tip, then electrons flow from the filled electronic states on the surface into the tip. If the sample is positively biased, then electrons flow from the tip into the empty electronic states of the surface. The magnitude of the bias voltage determines the surface states that are available to tunnel into or out of. Thus, the STM provides information about the electronic states as well as the topography of the surface of the sample.

The resulting current between the tip and the sample based on the applied bias voltage varies exponentially relative to the distance between the tip and the surface of the sample. Atomic-scale surface features cause a change in tip-sample distance and consequently in the current. A control system measures the current passed through a current pre-amplifier and adjusts the Z-axis tip position to compensate for the current variations. Thus, the tip vertical motion is proportional to the height of atomic-scale surface features, and the controller generates topographical information characterizing the surface. Often, the control system actuates a piezoelectric element to control movement of the tip up and down (i.e., z-direction) until the measured tunnel current matches a set point value, which is in the range of about 0.01 to about 100 nA. Piezoelectric elements are also commonly used to move the tip sideways (i.e., x-y directions) across the surface of the sample. As a result, topographic images of the surface can be generated by performing a raster scan of part of the surface.

In practice, poor control performance of the control system, particularly in the z-direction can result in unsafe decreases in the tip-sample gap and even a tip-sample crash. Such a crash between the tip and sample can cause irreversible damage to both the tip and the sample, adding to the operation costs. Even a less impactful crash can compromise the integrity of collected topographic information or result in errors in patterning when the STM is used in nano-lithography applications. In lithography applications, the STM operates at higher current, higher bias voltage and in some cases smaller tip-sample gap, accordingly a tip crash may be more likely and the consequences of a crash may be even greater than in surface characterization applications. Due to its general robustness and relatively easy implementation, proportional integral (PI) controllers have been used as in control systems in commercial STMs. However, current controllers have not been satisfactory in all respects.

BRIEF DESCRIPTION OF THE DRAWINGS

Illustrative embodiments of the present disclosure will be described with reference to the accompanying drawings, of which:

FIGS. 1A, 1B, and 1C are diagrammatic schematic views of an STM system according to an embodiment of the present disclosure.

FIG. 5 is a model of G(s) according to an embodiment of the present disclosure.

FIGS. 9A, 9B, and 9C include Bode plots of a closed-loop output sensitivity function, a closed-loop imaging function, and simulated time responses of a closed-loop system to a step input in topography, respectively, according to an embodiment of the present disclosure.

Figure 1A:
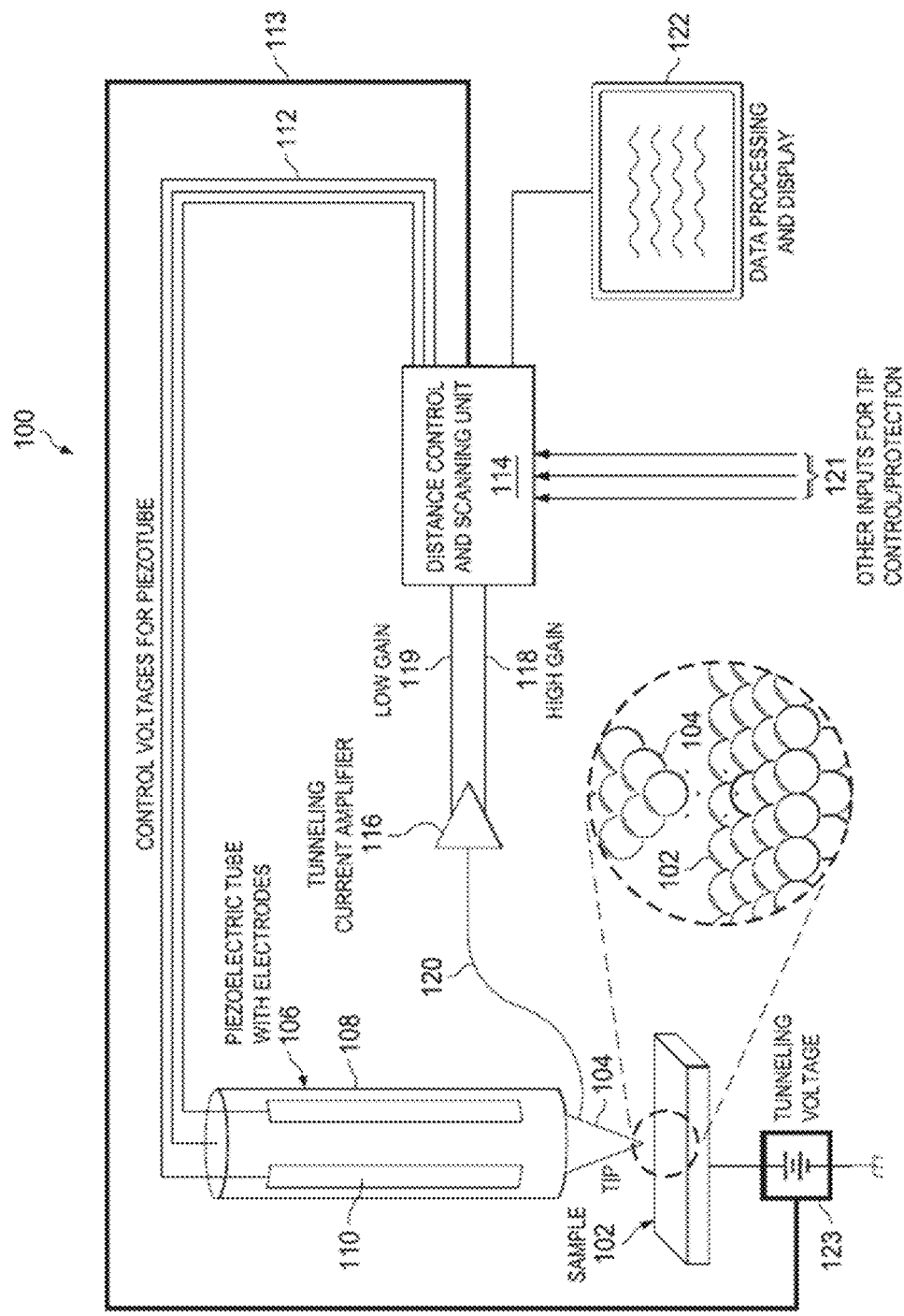

These figures will be better understood by reference to the following Detailed Description.

DETAILED DESCRIPTION

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described methods, devices, and systems, and any further application of the principles of the present disclosure are fully contemplated and included within the present disclosure as would normally occur to one skilled in the art to which the disclosure relates. In particular, it is fully contemplated that the steps, features, and/or components described with respect to one embodiment may be combined with the steps, features, and/or components described with respect to other embodiments of the present disclosure. For the sake of brevity, however, the numerous iterations of these combinations will not be described separately.

Improved Scanning Tunneling Microscope System

Referring initially to FIGS. 1A, 1B, and 1C, shown therein is an STM system 100 according to an embodiment of the present disclosure. As shown, a sample 102 is positioned in close proximity to a tip 104 of the STM system 100. The tip 104 is a conducting tip (e.g., formed of tungsten, platinum-iridium, or other suitable conductive material) that has been prepared so as to have a nanoscopic portion of the tip which allows electrons to tunnel to or from the nanoscopic portion of the tip to a sample. With the tip 104 positioned close to an upper surface of the sample 102, current flows across the gap between the tip 104 and the sample 102 when a bias voltage is applied between the tip 104 and the sample 102 due to the principle of electron tunneling. The bias voltage applied between the tip 104 and the sample 102 can be either polarity. If the sample 102 is negatively biased with respect to the tip 104, then electrons flow from the filled electronic states on the surface into the tip 104. If the sample 102 is positively biased, then electrons flow from the tip 104 into the empty electronic states of the surface. The magnitude of the bias voltage determines the surface states that are available to tunnel into or out of.

During electron tunneling, the resulting current between the tip 104 and the sample 102 based on the applied bias voltage varies exponentially relative to the distance 103 or height of the gap between the tip 104 and the surface of the sample 102. As a result of this strong dependence on the relative position of the tip 104 to the sample 102, the height of the tip 104 above the surface may be precisely controlled. In the illustrated embodiment, a positioning system 106 precisely controls the movement of the tip 104 relative to the sample 102. The positioning system 106 includes a piezoelectric element 108 coupled to a plurality of electrodes 110. While the piezoelectric element 108 is depicted as a single element, it is understood that the piezoelectric element 108 includes a plurality of piezoelectric elements in some instances. To this end, in some implementations one or more piezoelectric elements are configured to control movement of the tip 104 in a particular direction or directions (e.g., x-direction, y-direction, and/or z-direction). By controlling the application of voltage to the piezoelectric element 108 via the electrodes 110, the positioning system 106 is able to control movement of the tip 104 relative to the sample 102 and the sample bias unit 123 (tunneling voltage). To this end, a plurality of electrical leads 112 couple the electrodes 110 to a control unit 114 that implements a control system to position the tip 104 and adjust the bias between the tip 104 and sample 102. Also electrical lead 113 couples the control unit 114 to the sample bias unit 123 to allow the control of the sample bias. In some instances, the control unit 114 determines the appropriate voltage to be applied to each electrode 110 to impart the desired movement to the tip 104.

In some embodiments, the control unit 114 may include a central processing unit (CPU) and/or a digital signal processor (DSP) program to control the STM system 100 as is described herein. In doing so, the control unit 114 may implement one or more methods described herein. Some embodiments of the control unit 114 may include software program to cause the control unit 114 to perform certain operations. As will be described in more detail herein, one or more control systems implemented by the control unit 114 may estimate characteristics of the DC gain of system that are subject to change during operation. The control unit 114 may adjust the tip 104 in the z-direction to compensate for the detected and estimated changes.

In some embodiments, the scanning tunneling microscope system 100 includes both fine motion control (e.g., on the order of an Angstrom to a micron in the x and y-directions, on the order of 1 pm to a micron in the z-direction) and coarse motion control (e.g., which can be sufficiently large to satisfy the job at hand). For instance there are high resolution stages from Attocube, PI, and other vendors that allow more than a cm of motion and larger range of motion is, in principle, possible. In some instances, coarse motion is in the range of tens of nanometers to tens of millimeters, with a precision finer than the maximum fine motion range). In that regard, the STM system 100 may include one or more additional controllers or actuators to facilitate coarse movement of the tip 104 in the x, y, and/or z-directions. Further, in some implementations the scanning tunneling microscope system 100 includes one or more controllers or actuators for moving the sample 102 in the x, y, and/or z-directions relative to the tip 104. While many permutations of motion control may be used, in some instances the scanning tunneling microscope system 100 utilizes one of the following arrangements: (1) the sample 102 is stationary and the tip 104 does all of the coarse and fine movements relative to the sample 102; (2) the tip 104 is stationary and the sample 102 does all the coarse and fine movements relative to the tip 104; or (3) the tip 104 does all of the fine movements and the sample 102 does all of the coarse movements. Further, it is understood that the particular combination of coarse and fine motion control may be applied globally (i.e., to all directions of movement) or to a specific direction or directions (e.g., x-, y-, and/or z-directions). Accordingly, it is understood that the scanning tunneling microscope system 100 may utilize any one or a combination of these motion control options in implementing the motion control features discussed herein below.

In some instances, the scanning tunneling microscope system 100 includes one or more encoders to track movement and/or position of the tip 104. For example, in some implementations encoders with an accuracy of one micrometer or better, and preferably less than 100 nm, are utilized to track coarse motion in the x- and y-directions. An encoder is utilized to track the z-direction motion, in some instances, to reduce the amount of time to position the tip 104 in close proximity to the sample 102. In some instances, the closed loop position control described herein with respect to the fine motion control is not utilized and/or turned off when coarse movements are being made. Fine motion encoders are also utilized in some instances. To this end, x-, y-, and/or z-direction fine motion encoders with an accuracy 1 nm or less, and preferably less than 100 pm, are utilized in some instances. The information from the fine motion encoder(s) can be utilized instead of or in addition to the current feedback loop (utilized for assessment of z-direction control) and/or the lattice structure fiducial grid (utilized for assessment of x-y direction control) as described below. As described below, in some instances the automated patterning processes of the present disclosure utilize an active feedback loop and/or well-calibrated model corrections to ensure that the tip position in the x-y direction is accurate to approximately 0.1 nm.

The control unit 114 is configured to receive signals from a tunneling current amplifier 116 over communication lines 118 and 119. In the illustrated embodiment, the amplifier 116 is represented as a two-stage amplifier having a high gain output along communication line 118 and a low gain output along communication line 119. The amplifier 116 is electrically coupled to the tip 104 by line 120. In some instances, the control unit 114 utilizes the measured tunnel current from the tip 104 and/or other input(s) 121 to control the voltages applied to the electrodes 110. Additional aspects of the manner in which the control unit 114 controls the application of voltages to the electrodes 110 and corresponding movement of the tip 104 relative to the sample will be discussed in greater detail below. The control unit 114 is in communication with a data processing and display system 122 that is configured to process the data received from tip 104 and generate a corresponding image of the sample 102.

Because the tip 104 is positioned above the surface of the sample in a precisely controlled manner, at least the portion of the system 100 associated with tip 104 may be isolated from any external vibration in order to prevent vibrations from harming the imaging resolution and to prevent any perturbations that might cause the tip 104 to collide with the surface. Vibration isolation is provided to facilitate maintaining approximately +/−1 pm positioning control in the z-direction. Fortunately, vibration isolation technology is available that will suffice for this purpose. For example, some implementations of the present disclosure suspend the system by springs and dissipate vibrations using eddy current damping. However, any suitable vibration isolation techniques may be utilized. Additional information regarding the structure and control of an exemplary STM system is found in U.S. Pat. No. 9,329,201, filed Mar. 13, 2014, and entitled "Methods, Devices, and Systems for Forming Atomically Precise Structures," the disclosure of which is incorporated herein in its entirety.

Tip-Sample Contact

An unfortunately common occurrence in the operation of STM systems is an encounter between the tip and the sample that changes the structure of the tip. This change to the structure of the tip often results in changes to the way the tip images. These changes in tip structure can be corrected in some instances by further modifying the tip shape (e.g., by intentionally imparting additional tip-to-sample encounters) until the tip returns to a useful condition for imaging. However, these changes to the structure of the tip may pose a larger problem for lithography processes that are more sensitive to tip changes than imaging processes, such as a depassivation lithography process that relies upon a repeatable depassivation process. Further, any time spent repairing, or attempting to repair, the tip is unproductive time that is to be avoided in an automated patterning procedure.

The cause of these encounters between the tip and the sample is typically a perturbation to the closed loop system that adjusts the tip height to maintain a set point current. In standard commercial STM systems, this control system is generally a proportional-integral ("PI") controller or a proportional-integral-derivative ("PID") controller with the differential coefficient set to zero coupled to the mechanical STM described above. When the set point current is properly maintained, the tip is nominally maintained at about 1 nm above the sample surface. The majority of the time the control loop makes the appropriate adjustments to tip height as the tip is scanned across the sample surface such that the topography of the sample surface is recorded and the tip is not modified. However, when occasionally faced with a significantly large perturbation, the control loop in an attempt to regain the set point current may drive the tip too close to the surface or the tip will react too slowly to a perturbation and the tip will have a close encounter with (where fields and currents both increase) or crash into the sample. Due to the small size of the tip, these encounters with the sample surface often result in modifications to the shape of the tip. For example, the modifications can be anything from a very subtle rearrangement of atoms near the end of the tip to spectacular crashes that dramatically alter the tip (e.g., creating loops or turns in the tip structure). The perturbations that cause the tip to contact the sample can come from various sources, including without limitation external vibrations, spikes in electrical noise, a scan speed combined with a relatively large topographical feature that the control system does not have the bandwidth to respond to, changes in the tip bias, changes in set point current, changes in the state of the surface, and/or combinations of these factors.

In the context of hydrogen depassivation lithography on a Si(100) surface, proper sample preparation minimizes the number of significant surface topographical features. However, the depassivation lithography process itself significantly modifies the bias and current set point as the STM system switches between an imaging mode and the various lithography modes. These changes to the bias and current set point can cause significant perturbations to the tip height control loop. Several approaches are potentially available to minimize this perturbation. Simply turning off the feedback loop, changing the settings, and then turning the feedback loop back on is one approach. However, using such an approach can still present a perturbation to the control system when the feedback loop is turned back on and the tip is not in the correct position for the new settings. Changing the bias and/or current set point slowly would seem to be another way to avoid a major perturbation but such an approach takes additional time and can lead to a tip crash if changing slowly through a zero bias with a non-zero current.

Another problem for the tip control feedback loop arises when some perturbation excites a resonance in the STM system. Such resonances can lead to non-linear behaviors that result in poor control of the tip position and, therefore, possible crashes into the sample. Accordingly, in some instances a higher-ordered control system that takes into consideration the resonances in the scanning system is utilized. Similarly, in some instances a scanner that has well behaved resonances (e.g., stable in frequency) is utilized such that the control system can take such behavior into consideration in controlling the tip position.

Further, in some embodiments the control algorithm is implemented by the control unit 114 such that the highest priority of the control algorithm is to avoid interactions between the tip and the sample so that other control parameters (e.g., maintaining a constant tip-sample current) are secondary to protecting the tip. A control loop may continuously respond to errors. Moving the tip in response to larger errors (e.g., pulling the tip away in order to protect the tip) degrades the imaging quality of the STM. However, in some implementations the current signal and the topographical signal are captured. Since the current to distance relationship is known, the current signal can be used to mitigate the topographical errors due to the protective control system.

Another strategy is to use multiple inputs as part of the tip protection system. The tunneling current is the only input to standard STM control systems trying to maintain a static set-point current. For a standard system with a single tunneling current preamp, there is a tradeoff between gain and bandwidth. Often the desirable gain for imaging operations leads to a relatively low bandwidth diminishing the opportunity to respond fast enough to prevent crashes. Separate preamps are utilized in some instances. Further, in some embodiments a preamp with dual outputs such as shown in FIG. 1A (e.g., one high bandwidth, lower gain output 119 and one standard high gain, lower bandwidth output 118 for imaging) is utilized. The higher bandwidth signal is used as the input to the tip protection function and the higher gain input is used to maintain the set point current. Shown in FIG. 1, other inputs 121 that can be used for the tip protect function are the sample bias voltage, the piezo bias voltages, and/or an accelerometer. Such inputs are principally looking for anomalous behavior (e.g., unintended voltage spikes or mechanical perturbations) that could be reacted to before they create a tip crash. Further, in some instances a second output of the tip control system controls a separate fast acting actuator that is used to quickly increase the tip to sample distance to avoid a crash.

By utilizing one or more of the tip control techniques described above, the distance between the tip and the surface is stabilized, preventing unwanted damage to the tip. In some implementations, the tip position is monitored with a feedback loop in order to control the relative position of the tip to within a few pm. This precise control of the tip position that prevents damage to the tip can also facilitate improved depassivation processes (e.g., allowing removal of adjacent hydrogen atoms from a silicon surface in a single pass with a relatively low bias voltage by positioning the tip equally between the hydrogen atoms).

High Performance Control System

Figure 2:
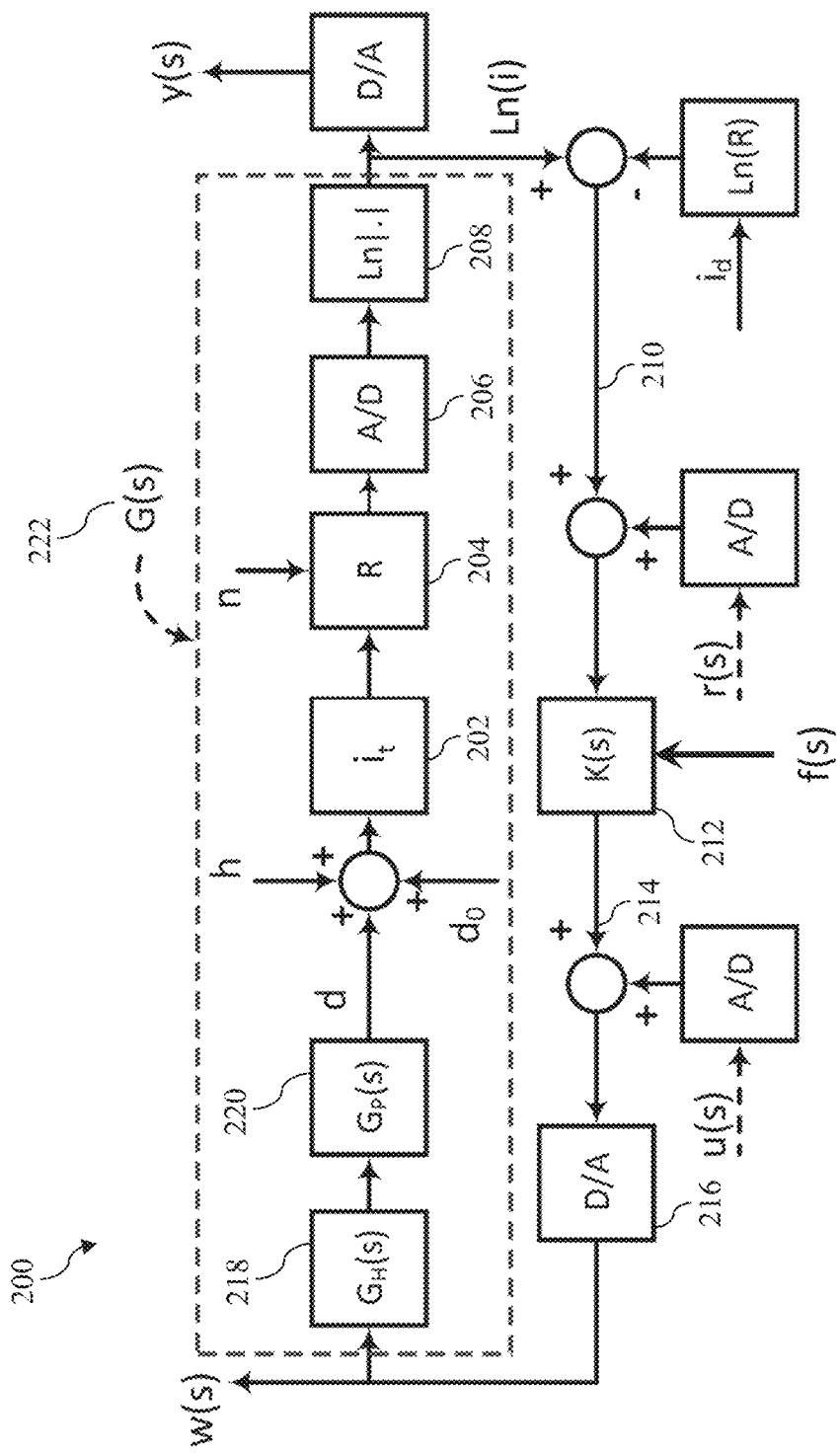
FIG. 2 is a block diagram of an exemplary Z-axis control system according to an embodiment of the present disclosure.

FIG. 2 illustrates a block diagram of an exemplary Z-axis control system 200 that may be employed in the STM system 100 of FIG. 1, and may be implemented by the control unit 114 described above. In some implementations, the control unit 114 implementing the control system 200 may be fully integrated into an STM system. In other implementations, the control unit 114 may be provided as an external unit electronically coupled to an existing STM system. A nano-ampere-range tunneling current ($i_t$) (block 202) is passed through a current-to-voltage converter 204. The current to voltage converter 204 may have an adjustable gain. In some implementations, the converter 204 may operate with a gain of $10^9 \Omega$. Some embodiments may utilize a DLPCA-200 current-to-voltage converter, available from Electro Optical Components, Inc., of Santa Rosa, Calif. The output of this pre-amplifier stage may then be quantized and sampled by a 16-bit 25 kHz A/D converter or any other suitable A/D converter 206.

Figure 3:
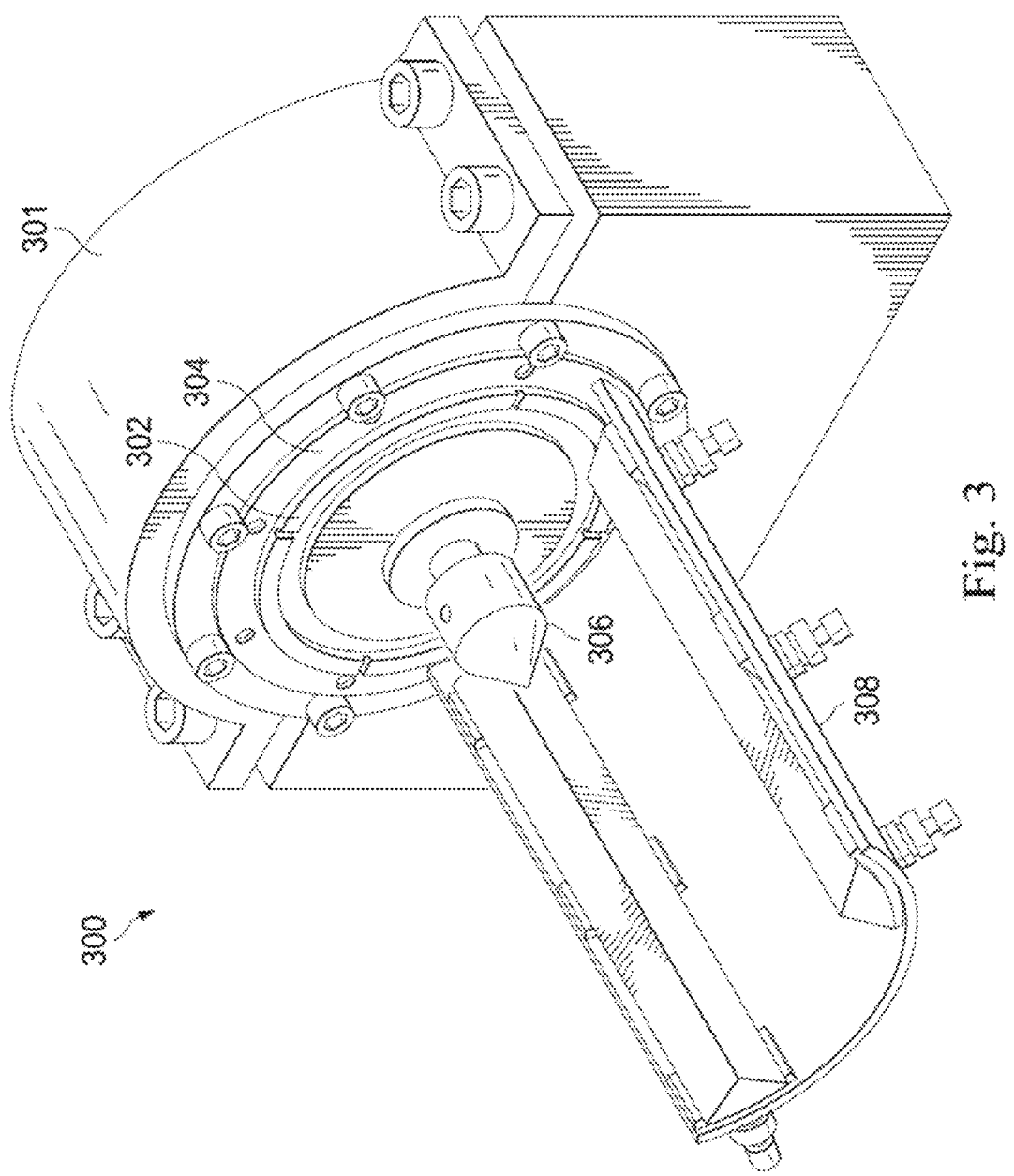
FIG. 3 is an exemplary present positioning system that may be used in an STM system according to an embodiment of the present disclosure.

The natural logarithm of the measured current may be obtained at block 208 by an encoder or signal processor, and then, the current logarithm ($i_{ln}$) may be compared to the logarithm of current set-point ($i_d$) to generate an error signal 210 which may be provided to the PI controller 212, labeled K(s). Types of controllers other than PI controllers may be used in some embodiments. The output of K(s) may be a motion command 214 that is communicated to an actuator 220 after being converted to an analog signal passing through a D/A converter 216. The analog motion command 214 may then be further amplified by a High-Voltage Amplifier (HVA) 218, represented in the control system 200 by $G_H(s)$. The actuator 220 (represented as $G_p(s)$) may be, or may be part of, the positioning system 106. Together, the HVA 218, the actuator 220, the converter 204, the converter 206, and the encoder 208 may be referred to generally as the plant 222 (represented as G(s)). In some implementations, the actuator 220 may be a Lyding scanner having two concentric piezoelectric tubes, as shown in FIG. 3. (See J. W. Lyding, S. Skala, J. S. Hubacek, R. Brockenbrough, and G. Gammie, "Variable-temperature scanning tunneling microscope," *Rev. Sci. Instrum.*, vol. 59, no. 9, pp. 1897-1902, 1988, the disclosure of which is incorporated herein by reference in its entirety.) Other implementations may include other suitable types of scanners.

FIG. 3 illustrates an exemplary scanner or positioning system 300 according to some embodiments of the present disclosure. The positioning system 300 may be or may be part of the positioning system 106 of FIG. 1 and/or the actuator 220 of FIG. 2. In some examples, the positioning system 300 includes a tip holder 306 for retaining a scanning tip 104 and a sample holder 308 for retaining a sample 102. The positioning system 300 may include an inner piezo-tube 302 that facilitates fine motion of the scanning tip 104 relative to the sample 102 either in z-direction or in the x-y-plane. The piezo-tube 302 may be coupled directly to a body 301 or indirectly to the body 301 by an outer piezo-tube 304. The outer-piezo tube 304 may provide coarse motion of the sample 102 toward the tip 104. Some embodiments of the piezo-tube 304 may use a stick-slip mechanism during the approaching phase before a tunneling current has been established. The inner tube 302 is coupled to the tip holder 306. In operation, the tip holder 306 can move relative to the inner tube 302, resulting in a change in its mechanical resonance. As is described in more detail below, a feedback signal f(s) may be provided to the controller 212 to improve the positioning of the tip holder 306 in the z-direction.

Returning to FIG. 2, the actuator 220 may produce a tip-to-surface distance d, also referred to as a tip-surface gap. While scanning, the surface topography (as shown in FIG. 1B) may appear as an unknown disturbance h in the tip-sample gap and may result in variation of tunneling current. The control unit 114, utilizing the control system 200, adjusts the vertical position of the tip in effort keep the current constant during scanning. In this way, the control unit 114 may generate command maps associated with the surface topography. When present, misalignment of the sample may generate another disturbance $d_o$ while noise n (shown as an input to the converter 204) is mainly generated with current measurement. By obtaining knowledge of open-loop dynamics of G(s), the control system 200 may provide for improved system analysis, correction, and performance.

Closed-loop System Identification

The control unit 114 includes a dynamic model of the plant (G(s)) to be controlled. Because the tunneling current may be a major part of the plant with unknown parameters and is only sustained under feedback control, the identification tests use to derive the dynamic model are performed while the closed-loop feedback of control system 200 is operating. One challenge associated with the closed-loop identification is that the output noise may be correlated with the input to the plant due to the feedback. Thus, direct identification of the open-loop plant from the closed-loop data is challenging. One approach that may be implemented in embodiments of the control system 200 is to inject a known signal into the closed loop and record the output of the plant (which is also the output of the closed-loop system) as well as the input to the plant (which is another output of the closed-loop). The underlying systems between the deterministic injected signal and the two measured noisy outputs are the closed-loop systems which are identified without noise-input correlation problem. The open-loop models may be later extracted from the identified closed-loop models.

In some implementations, the identification tests are performed in frequency-domain. A harmonic identification signal r(s) is injected to the closed-loop set-point by the control unit 114, which then records the resulting gain and phase at the outputs y(s) and w(s). By sweeping the frequency of the injected signal, the Frequency Response Function (FRF) between each I/O pair may be obtained. Furthermore, the measured values at each single frequency point may be average, which may alleviate the measurement noise. For FRF measurements, the control unit 114 may include an FFT analyzer. Some implementations may utilize an outboard FFT analyzer, such as the CF-9400 FFT Analyzer, made by ONO SOKKI of Yokohama, Japan. In some implementations, the same procedure may be repeated by injecting a harmonic signal u(s) into the control system 200 between the controller 212 and the converter 216. Again, the control unit 114 or a component thereof records the system outputs y(s) and w(s).

Knowing the structure of the feedback in control system 200, the four systems between each I/O pair are given by equations (1)-(4) as:

$$G^c_{r2w}(s) = \frac{w(s)}{r(s)} = \frac{z(s)K(s)z(s)}{1 + K(s)z(s)G(s)} \quad (1)$$

$$G^c_{r2y}(s) = \frac{y(s)}{r(s)} = \frac{z(s)K(s)z(s)G(s)z(s)}{1 + K(s)z(s)G(s)} \quad (2)$$

$$G^c_{u2w}(s) = \frac{w(s)}{u(s)} = \frac{z(s)z(s)}{1 + K(s)z(s)G(s)} \quad (3)$$

$$G^c_{u2y}(s) = \frac{y(s)}{u(s)} = \frac{z(s)z(s)G(s)z(s)}{1 + K(s)z(s)G(s)} \quad (4)$$

In equations (1)-(4), z(s) describes the zero-order hold model of the A/D and D/A blocks (converters 206 and 216, respectively). Closed-loop FRFs (1)-(4) may result from the I/O measurements. In order to obtain the open-loop model G(s) for control design purposes, the obtained closed-loop FRFs may be divided at each frequency point to obtain equations (5) and (6):

$$G_1(s) = \frac{G^c_{u2y}(s)}{G^c_{u2w}(s)} = z(s)G(s) \quad (5)$$

$$G_2(s) = \frac{G^c_{r2y}(s)}{G^c_{r2w}(s)} = z(s)G(s) \quad (6)$$

With fixed sampling frequency, z(s) may be known and thus both $G_1(s)$ and $G_2(s)$ represent the open-loop dynamics G(s) after a further division by z(s), and thus (5) and (6) may match over a wide frequency range. The control unit 114 may also obtain the controller dynamics K(s) by dividing (1) by (3) and (2) by (4), which can be used for validation purposes since the dynamics of the controller 212 are already known. To avoid nonlinearities in the system, to prevent tip-sample crash due to large oscillations near resonance frequencies, and also to maintain good signal-to-noise ratio during the tests, the frequency range of interest may be divided into several intervals over which the amplitude of the input signal is adjusted properly.

Figure 4A:
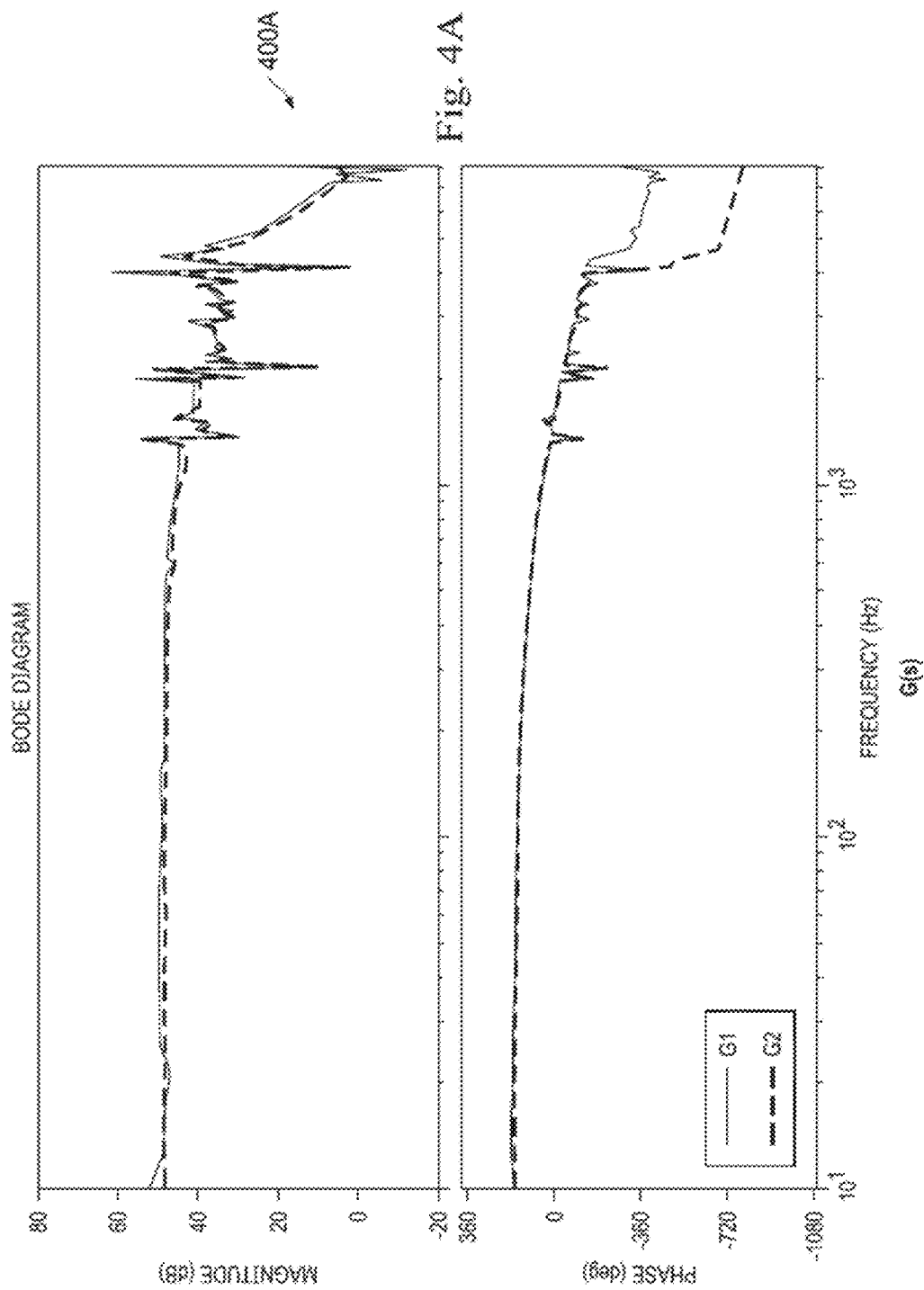
FIGS. 4A and 4B depict exemplary obtained Bode diagrams describing the plant and controller of an STM system according to an embodiment of the present disclosure.
Figure 4B:
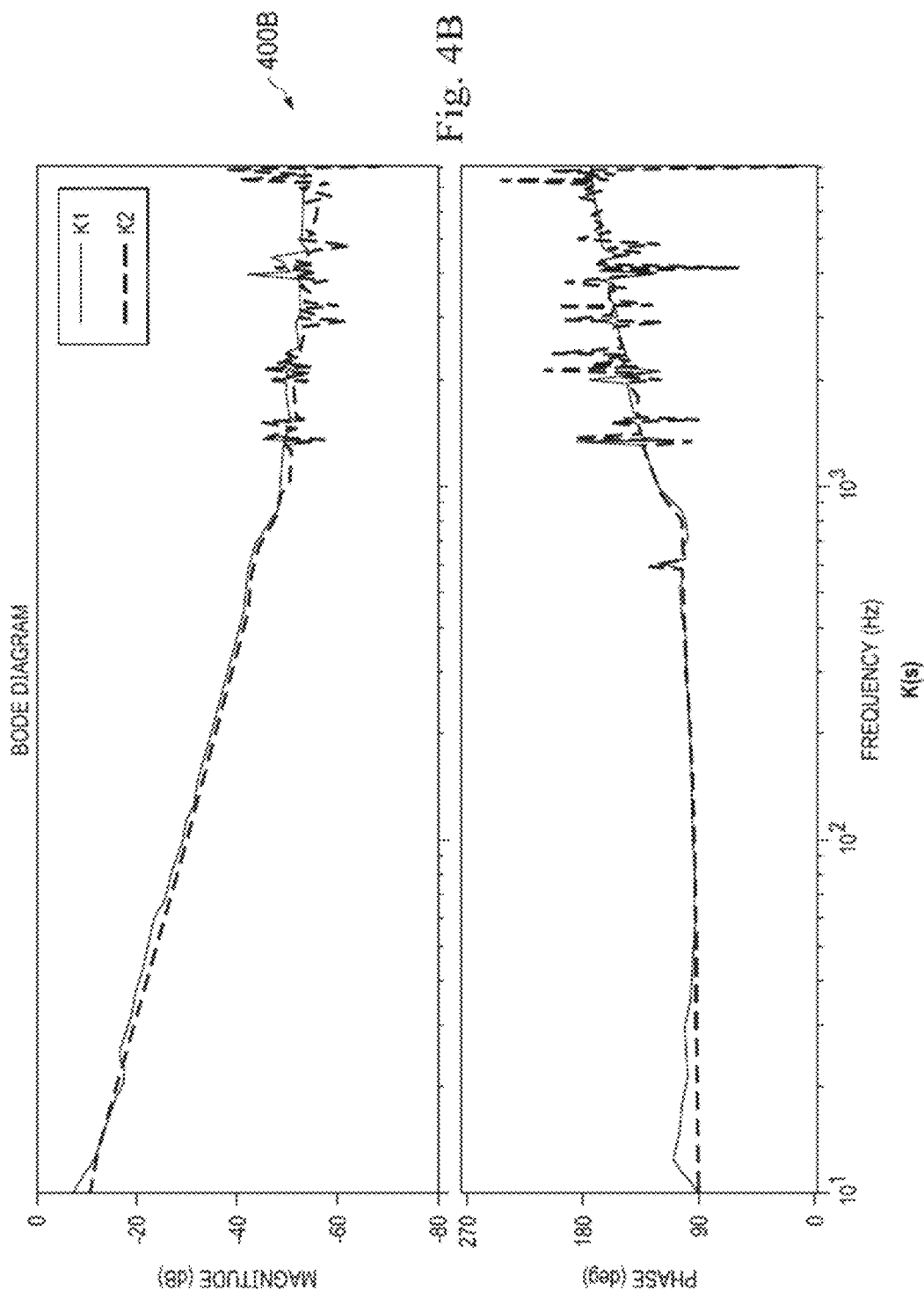

FIGS. 4A and 4B depict exemplary obtained Bode diagrams describing the plant (diagram 400A) and controller (diagram 400B) of the control system 200 according to an embodiment of the present disclosure. Once the open-loop FRF (for the plant) or FRFs (for the plant and controller) are obtained, a transfer function (TF) model is fitted to the measured data to derive a mathematical model of the system dynamics that can the utilized by the control unit 114. Such a model 500 of G(s) is shown in FIG. 5, which includes measured data 502 used to derive the mathematical model 504. In some embodiments of the model 504, only dominant resonances may be considered while fitting the model which is obtained as:

$$G(s) = \frac{Ce^{-Ts}}{\left(\frac{1}{2\pi\omega_0}s + 1\right)} \sum_{m=1}^{N} \frac{\left(\frac{s}{2\pi f_m}\right)^2 + 2\zeta_m\left(\frac{s}{2\pi f_m}\right) + 1}{\left(\frac{s}{2\pi\omega_m}\right)^2 + 2\eta_m\left(\frac{s}{2\pi f_m}\right) + 1} \quad (7)$$

in which C=−213, T=80 μs, $\omega_0$=1 kHz, and other parameters as given in Table I. Experimentally, it is noted that the poles and zeros associated with m=1 in Table I do not seem to originate from the piezo-tube resonance. Rather, they are believed to arise from a resolvable mechanical issue with the tip holder mechanism.

TABLE I

IDENTIFIED MODEL PARAMETERS

| | m | | | | |
|---|---|---|---|---|---|
| | 1 | 2 | 3 | 4 | 5 |
| $\omega_m$ (kHz) | 0.468 | 1.520 | 1.880 | 2.780 | 4.010 |
| $\eta_m$ | 0.004 | 0.001 | 0.001 | 0.002 | 0.002 |
| $f_m$ (kHz) | 0.456 | 1.890 | 1.890 | 3.810 | 4.100 |
| $\zeta_m$ (kHz) | 0.003 | 0.002 | 0.002 | 0.001 | 0.001 |

It is noted that some of the model parameters may be subject to variation every time the STM is operated. For instance, after each tip-replacement and due to the mechanical displacement of the tip holder 306 (FIG. 3) in the scanner or positioning system 300, resonance frequencies are expected to change. In order to obtain an estimate of the range of variation of resonance frequencies, the identification tests were performed several different days. Results have shown that uncertainty in resonance frequencies are not more than 10% of the average value. Also, after establishment of current, the resonance frequencies are kept fixed since there may be no significant mechanical coarse motion in the tip holder 306 after the current is settled. The other uncertainty in the model parameters comes from variation of the model DC gain represented by C in (7). Variation of this parameter can happen during scanning and, in some experimental observations, remains in the range of 46.0 dB±3 dB.

Figure 6:
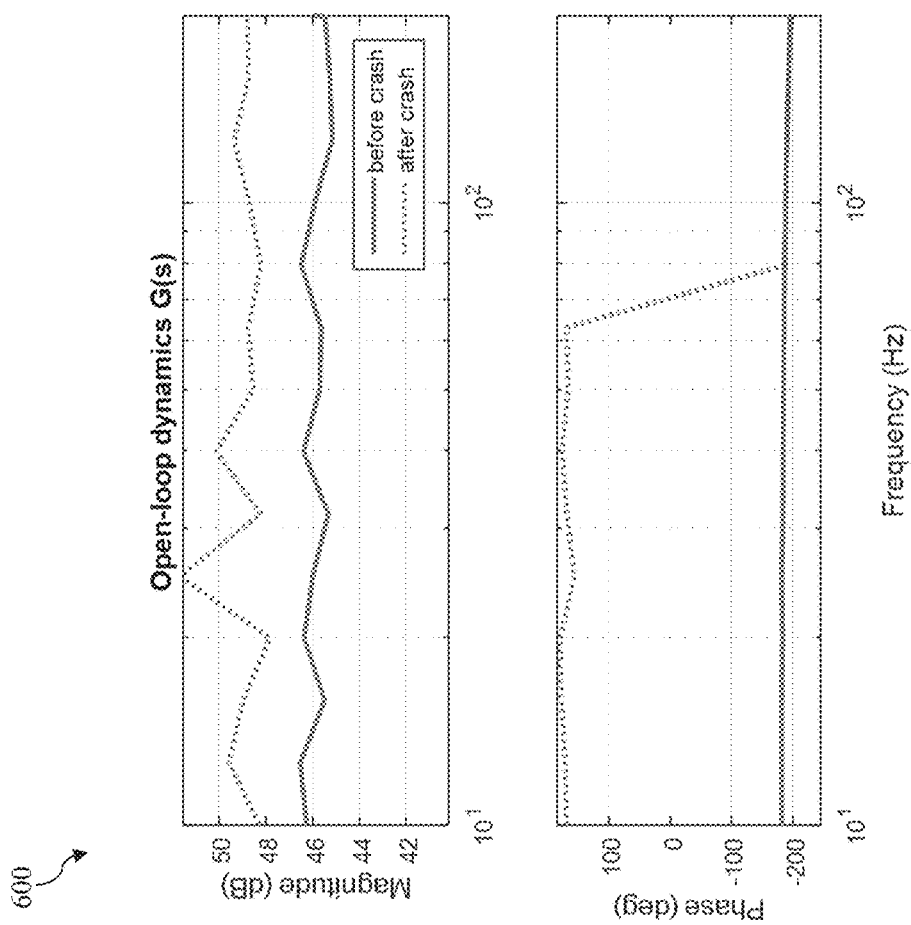
FIG. 6 is a low-frequency (e.g., $\omega$<40 Hz) Bode diagram including transfer function models before and after the interaction or crash.

Experimentally, it was observed that a significant DC gain variation in the transfer function model after a tip-surface interaction compared to a model produced before the tip-surface interaction, as seen in FIG. 6. FIG. 6 is a low-frequency (ω<40 Hz) Bode diagram 600 including transfer function models before and after the interaction or crash. While the mean and variance of the magnitude was 46.22 dB and 0.02 dB, respectively, before the crash, after the crash both the mean and variance increased to 49.24 dB and 1.8 dB, respectively. This was observed to be equivalent to the work function variation. Work function variations may arise from changes in the shape of the tip 104. As described herein, the "work function" is the energy used to move an electron from the tip 104 to the surface of sample 102 or from the surface of the sample 102 to the tip 104. The work function may also be referred to as the average barrier height and is affected by many factors including tip-to-surface distance, the shape of the tip, the chemistry of the tip, the bias voltage, etc.

In some embodiments of the model, it is assumed for the tunneling current $i_t$ is a function of a given tip-sample distance d as follows in equation (7×1):

$$i_t = \sigma V_B \exp(-\sqrt{\varphi} d) \quad (8)$$

where σ is some constant, $V_B$ is the bias and φ is the work function. Taking the logarithm in natural basis gives:

$$\ln(i_t) = \ln(\sigma) + \ln(V_B) - \sqrt{\varphi} d \quad (9)$$

Noting that STM systems are usually operated at constant bias voltages, $\sqrt{\varphi}$ contributes to the DC gain of the open-loop model (7) which is represented by parameter C in model (7). While there are other parameters that contribute to C in model (7), as well; they are all assumed to remain constant. One of these parameters is the sensitivity of the piezo-electric actuator for the z-direction, which is a constant and is determined by scanning a known surface feature such as a silicon step-edge. The apparent height of a step edge may be on the details of the voltage amplification and piezo response, but it does not depend on the work function. Thus, by scanning the step-edge, one can determine the piezo-electric actuator's sensitivity through a calibration procedure. Next in this disclosure, the model parameter C, which is mainly affected by work function, is utilized to contribute to the closed-loop system stability and performance.

Control System Analysis

The obtained model is used by the control unit 114 to analyze the performance of the STM system 100. A digital PI controller may be implemented in the STM software which can be represented in the continuous form by the following transfer function:

$$K(s) = -k_i \left( \frac{1}{s} + \frac{1}{\omega_c} \right) \quad (10)$$

with $k_i$ and $\omega_c$ representing the integrator gain and the corner frequency of the controller in rad/s, respectively.

In order to evaluate the effect of the two controller parameters, we first define the closed-loop stability and performance criteria. For a bounded topography disturbance at the sample surface, the displacement of tip 104 remains bounded. This may entail the loop transfer function of the system, given by (1), maintaining positive Gain Margin (GM) and Phase Margin (PM):

$$G_{loop}(s) = -\left( \frac{1}{s} + \frac{1}{\omega_c} \right) G(s) \quad (11)$$

For a given $\omega_c$, an integrator gain equal to the GM of (11), puts the closed-loop system in the marginal stability. Thus for stability, the control system may have $k_i < \mathrm{GM}\{G_{loop}(s)\}$.

The closed-loop system 200 is sufficiently fast enough to track the surface topography while scanning. The corresponding bandwidth depends on the scanning speed as well as the surface topography of the sample. Faster scanning utilizes higher bandwidth to track the same features. For example, a bandwidth of around 100 times of the rastering frequency is utilized in certain STM systems. Bandwidth of the imaging transfer function given by (2) determines the closed-loop bandwidth:

$$G_{img}(s) = \frac{CK(s)}{1 + K(s)G(s)} \quad (12)$$

In many examples, the closed-loop system response is stable and fast enough to track the features of sample 102, while also avoiding any undesired overshoot or fluctuations. Considering the highly resonant piezo-scanner, the control system 200 is configured not to excite the resonances; otherwise, the risk of a tip-sample crash may significantly increase. To provide these behaviors, some implementations may maintain the infinity norm of the imaging transfer function of equation (12) below a threshold. By definition, the infinity norm is the maximum of the gain over all frequencies:

$$\|G_{img}(j\omega)\|_\infty = \max_{\omega \in R}\{|G_{img}(j\omega)|\} \quad (13)$$

Figure 7:
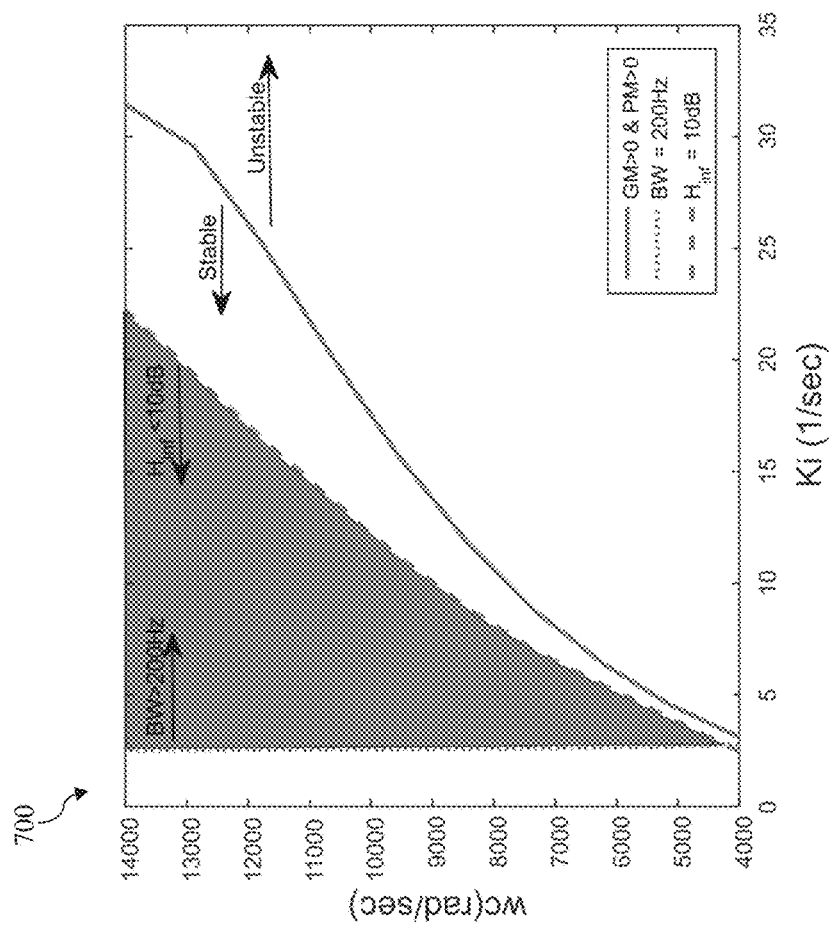
FIG. 7 is a plot showing the parameter space defined by stability, bandwidth, and limited overshoot criteria of a model according to an embodiment of the present disclosure.
Figure 8:
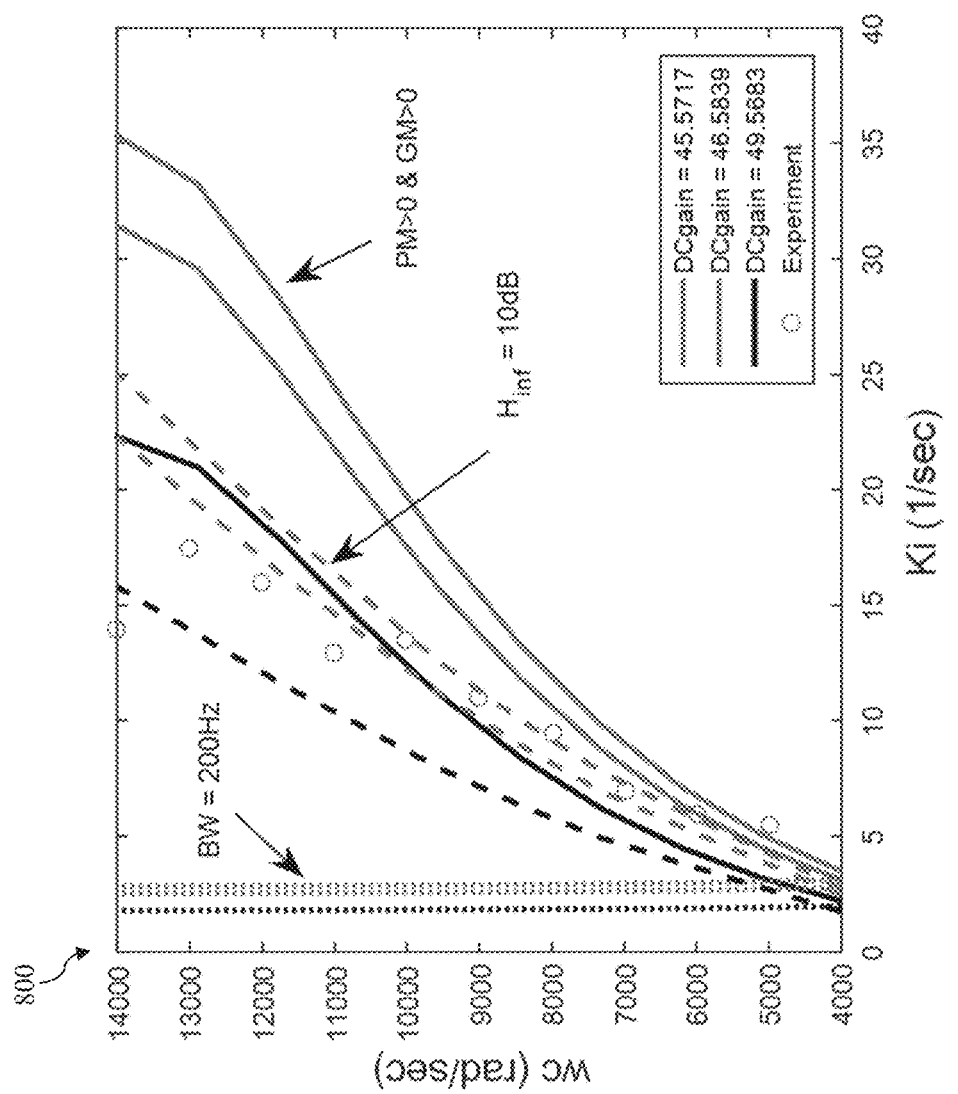
FIG. 8 is another plot showing the parameter space defined by stability, bandwidth, and limited overshoot criteria of a model according to an embodiment of the present disclosure.

The proposed stability and performance criteria result in three curves defining an acceptable parameter space of controller 212. Selecting a value for $\omega_c$, gain margin of system (9) gives the critical integrator gain which puts the system in the margin of stability. Repeating the procedure for various values of $\omega_c$, a curve shown with solid line in FIG. 7 is obtained, to the left of which the stability criterion is satisfied. FIG. 7 shows a plot 700 of the parameter space defined by the three criteria for stability, bandwidth, and limited overshoot obtained with model given by equation (7). Exemplary criteria include ω_BW=200 Hz and maximum infinity norm equal to 10 dB. Also, by selecting a desired closed-loop bandwidth $\omega_{BW}$ as well as a corner frequency $\omega_c$, an integrator gain $k_i$ may be found such that the system represented by equation (12) gives bandwidth $\omega_{BW}$. Repeating the procedure for various $\omega_c$ values, a curve in the controller parameter space is obtained, to the right of which the bandwidth criterion is satisfied, as shown in dotted curve in FIG. 7. Selecting a desired infinity norm and performing the same calculations, produces the dashed curve in FIG. 7 to the left of which criterion 3 is satisfied. Considering all three criteria, FIG. 7 indicates that the PI gains be selected in the shaded area to ensure stability, fast and safe performance of the closed-loop system in the corresponding embodiments. FIG. 8 is similar to the plot 700 of FIG. 7 and provides a plot 800 that compares the step response and closed-loop sensitivity and imaging functions for three values of $k_i$=2, 6, 12 where only $k_i$=6 is within the appropriate PI gains area.

As discussed herein, some of the model parameters are subject to change. Variation of parameter C in equation (7) can affect the stability and performance curves. FIG. 9A-9C display the closed-loop output sensitivity function 900A, a closed-loop imaging function 900B, and simulated time responses 900C of a closed-loop system to a step input in topography for three different values of C suggesting that appropriate PI gain area may decrease for higher values of C. Quality factor and frequency of resonances can also affect the appropriate gain area; however for a piezo-tube the quality factor is almost constant, and after current is established the resonance frequencies are expected to stay constant.

Figure 10:
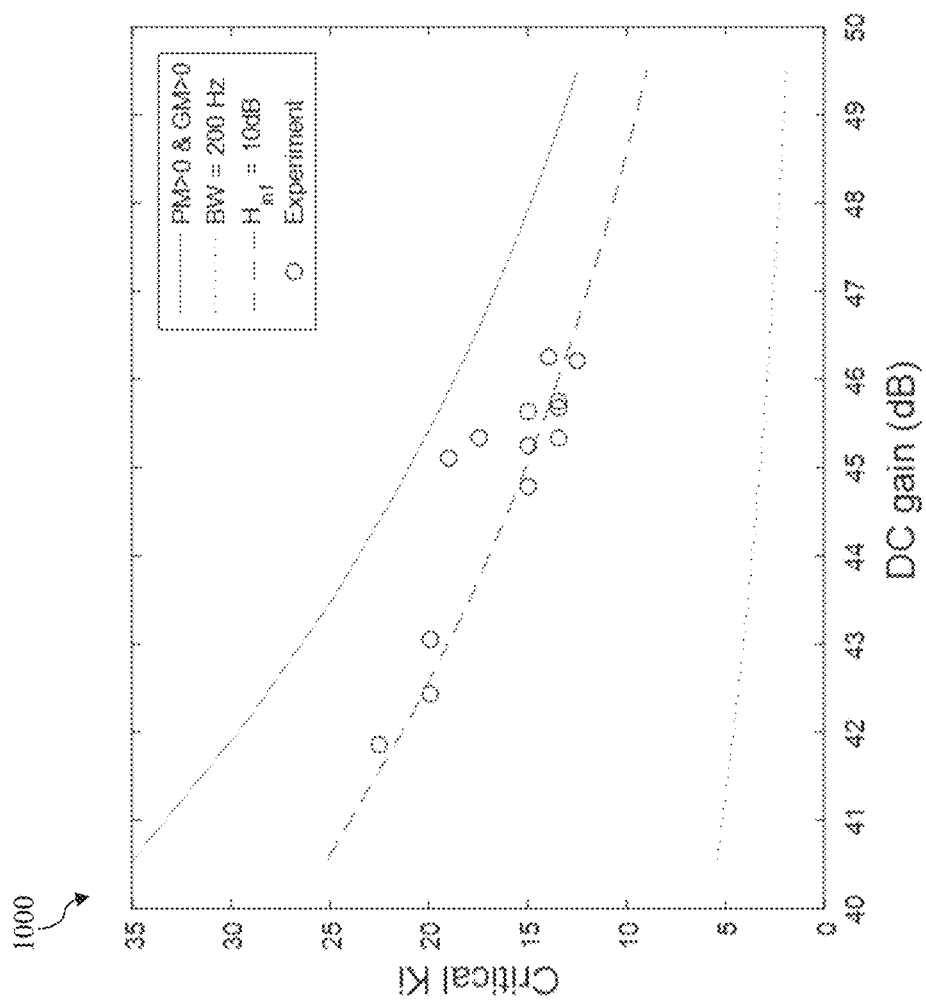
FIG. 10 is a plot of critical values of integrator gain versus model DC gain with some experimental results according to an embodiment of the present disclosure.

In order to validate the stated criteria, additional experiments were performed. After conducting system identification tests resulting in a model given by equation (7), the controller corner frequency $\omega_c$ was changed and, starting from a small value, the $k_i$ gain was increased. While this was being performed, the highest resonance peak appearing in the FFT of the tunneling current was monitored, which grows with $k_i$ gain. The value of $k_i$ that puts the highest FFT peak at a 10 dB equivalent level was recorded. Repeating the procedure for various $\omega_c$ values, results shown in FIG. 9 were obtained. Parameter C of equation (7) was measured prior to these tests as C=45.5 dB. Observations showed that for $\omega_c$<5 krad/s, harmonics of resonance frequencies appear in the system output suggesting that the nonlinear effects are dominant. This is consistent with the small gain of PI controller at higher frequencies being responsible for minimizing the effect of nonlinearities in the system response. With a small corner frequency, the high frequency gain of the PI controller may be too large to sufficiently reduce the nonlinear effects. Furthermore, the PI corner frequency was fixed at $\omega_c$=10 krad/s and the integrator gain putting the system at 10 dB threshold was measured while the parameter C was also measured at different conditions. Results are depicted in FIG. 10, which provides a plot 1000 that demonstrates agreement between theoretical and experimental results.

Keeping the structure of the control system 200 unchanged, $k_i$ and $\omega_c$ can be tuned to achieve fast and safe STM operation. The PI controller 212 may be tuned by selecting a corner frequency within the wide portion of the appropriate gains area shown in FIG. 7. For instance, $\omega_c$ may be fixed at 10 krad/s. Before scanning, starting from a small $k_i$ and increasing it such that FFT peak meets the 10 dB (or another defined safe value) threshold may be beneficial. Additionally, selecting $k_i$ as a half of its critical value obtained in previous step may provide improved results.

Analysis presented in this section shows that the stability and performance boundaries of the system may be severely affected by work function variation. Once the PI gains are tuned and the STM system is operating, a precipitate change in work function can easily put the controller gains out of the appropriate range for the changed work function value. Thus, instabilities can arise which can result in tip-sample crash. Adaptive STM system control is provided in a method for real-time estimation of work function while the STM system is operating and for adjusting the controller gains in reaction to any possible variation in work function to maintain system stability. This concept is described in more detail in the next section of this disclosure.

Adaptive Control System Tuning

By measuring the parameter C, which is related to the work function between tip and sample, control of the STM 100 can be adapted to improve z-direction positioning. In practice, direct measurement of C may not be possible because the model G(s) is always under closed-loop feedback. Furthermore, it may be problematic to measure C using DC signals. Also, it may be difficult to measure C without perturbing the system, because this gain represents the change in tunneling current as a change in the tip-sample distance. However, modulating the controller command or the set-point may permit measuring C. Calling what is modulated "x," a lock-in amplifier implemented in software or hardware can be implemented to modulate x. An open-loop system would permit measurement of:

$$\frac{dw}{dx}, \frac{d\ln(i)}{dx} \tag{14}$$

and calculation of the work function as:

$$C = -\frac{d\ln(i)}{dw} = -\frac{\frac{d\ln(i)}{dx}}{\frac{dw}{dx}} \tag{15}$$

Next, the injection of modulation signals into the closed-loop system and tracking their correspondence in the system output using the lock-in amplifier technique described. The objective is to provide a real-time estimate of parameter C in the model of equation (7).

Figure 11:
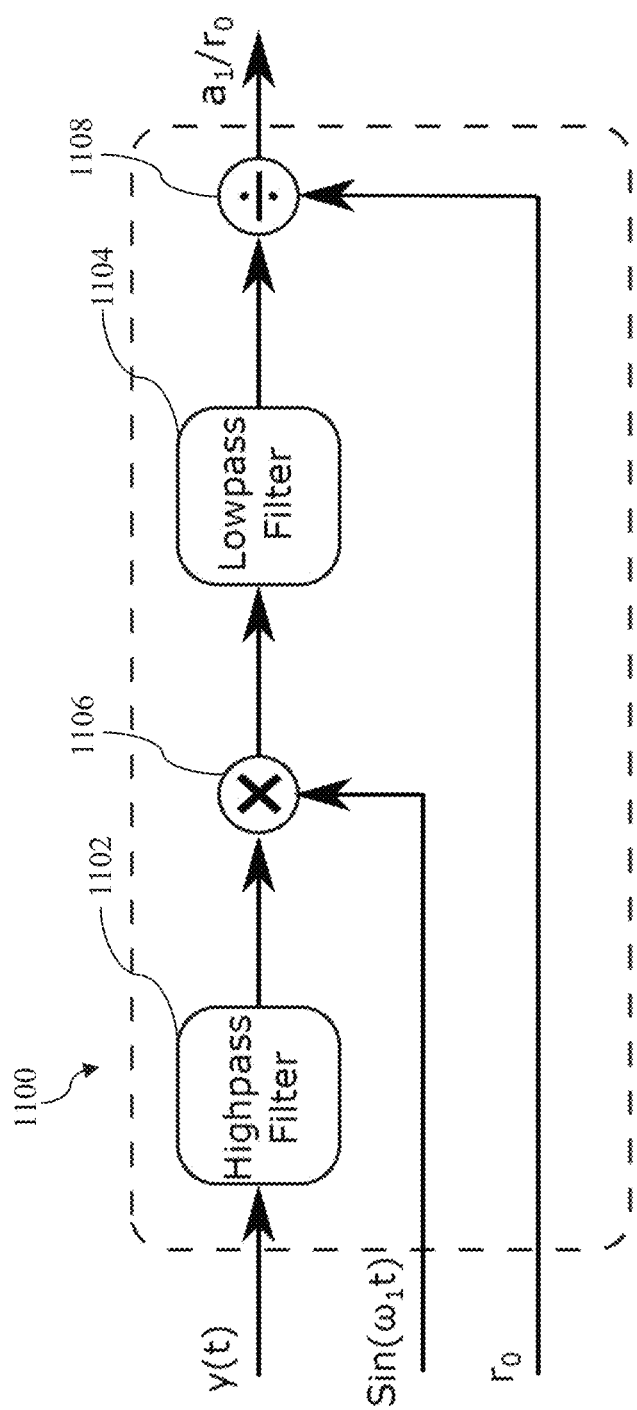
FIG. 11 depicts an amplitude estimator according to some embodiments of the present disclosure.

Because the control system 200 of FIG. 2 permits analysis and modeling of controller 212 (K(s)) and the plant G(s) including the amplifier 218 and the actuator 220, the STM system 100 may utilizing one or more of the tip control techniques described above to stabilize distance between the tip and the surface is stabilized, preventing unwanted damage to the tip. This may be done by incorporating one or more work function amplitude estimators into the control system 200 as described above. FIG. 11 depicts an amplitude estimator 1100, which may be embodied in hardware, software, or a combination thereof and incorporated into the control unit 114. The amplitude estimator 1100 accepts a measured signal y(t), a modulation signal $\sin(\omega_1 t)$, and an amplitude of the injected signal $r_0$ to provide an estimate of the parameter $a_1$. By dividing $a_1$ by $r_0$, the relative gain of the measured signal can be determined. The depicted embodiment of the amplitude estimator 1100 includes a high-pass filter 1102 and a low-pass filter 1104. The combination of filters may suppress noise and also suppress the DC and other low frequency components. In general, the higher the bandwidth provided by the filter 1104, the more noisy the estimation. However, as the bandwidth decreases, accuracy may improve. In some embodiments, the low-pass filter may block frequencies above about 15 Hz or about 30 Hz and the high-pass filter may block frequencies below about 200 Hz. Other cutoff frequencies may be used in other implementations. The amplitude estimator 1100 further includes a summing function or junction 1106 and a divider 1108, connected as shown in FIG. 11.

As discussed above, an exogenous harmonic identification signal having a fixed frequency to be injected into the control system 200 as either of the inputs u(s) or r(s) in locations is depicted in the control system 200 of FIG. 2. For example, the injected harmonic identification signal may have a frequency fixed at 1 kHz, which may be introduced at either of the inputs. In some embodiments, other frequencies may be used. u(s) may be injected into the z-direction voltage, and r(s) may be injected into the set-point. These inputs may be injected independently of one another in estimating the work function. The injected signal may be measured at both of the outputs y(s) and w(s), also as shown in FIG. 2. The measured output signal y(t) may be passed through the amplitude estimator 1100 to get equation (16) as follows:

$$RY = \frac{y(j\omega_1)}{r(j\omega_1)} = \frac{a_{1y}}{r_0} = \frac{C \cdot K(j\omega_1) \cdot G(j\omega_1)}{1 + C \cdot K(j\omega_1) \cdot G(j\omega_1)} \quad (16)$$

In equation (16), C is the open-loop DC gain, which is proportional to the work function. $K(j\omega_1)$ and $G(j\omega_1)$ are constant for fixed controller gains and open-loop dynamics. The measured signal w(t) may be passed through the amplitude estimator 1100, to obtain equation (17) as follows:

$$RW = \frac{w(j\omega_1)}{r(j\omega_1)} = \frac{a_{1w}}{r_0} = \frac{K(j\omega_1)}{1 + C \cdot K(j\omega_1) \cdot G(j\omega_1)} \quad (17)$$

By dividing equation (16) by equation (17), equation (18):

$$CG = C \cdot G(j\omega_1) = \frac{RY}{RW} \quad (18)$$

Figure 12:
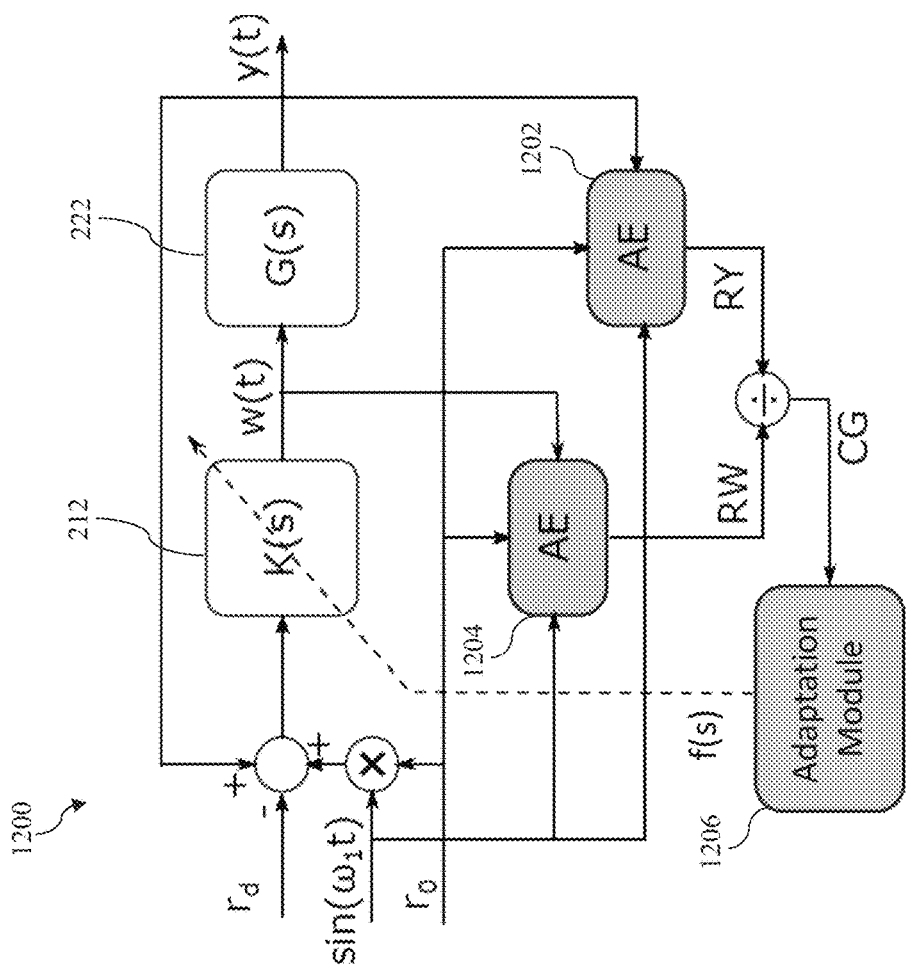
FIG. 12 is a block diagram of an exemplary Z-axis control system according to an embodiment of the present disclosure that includes the amplitude estimator of FIG. 11.

Assuming $G(j\omega_1)$ is constant, equation (18) provides an estimate of open-loop gain, which is proportional to the work function. FIG. 12 depicts the control system 1200 that incorporates aspects discussed above in connection with the control system 200 of FIG. 2. The control system 1200 provides an explicit depiction of how the controller 212 and the plant 222 are coupled to a first amplitude estimator 1202 and a second amplitude estimator 1204, in at least one embodiment. As can be seen in FIG. 12, the control system 1200 provides CG as an output. In this manner, the injected u(s) or r(s) signal is used to estimate the DC gain of the plant 222. Additionally, the control system 1200 includes an adaptation module 1206, a signal generator that produces an adaptation signal or feedback signal f(s) based on CG. The adaptation module 1206 may be implemented as hardware, software, or a combination thereof. For example, CG or a signal proportional to CG may be used as the feedback signal. As shown in FIG. 12, as well as in FIG. 2, the feedback signal is communicated to the controller 212 to the measured signal w(t), which is provided to the plant 222 to manipulate the position of the tip holder 306 and the tip 104 supported thereon.

As a simplified explanation, suppose the DC gain of the plant 222 (G(s)) is desired to be set to a typical value of $C_0$=200. If measurements indicate CG has dropped to a new value of $C_1$=150, the integrator gain of the controller 212 (K(s)) can be multiplied by a factor of $$\frac{C_0}{C_1} = \frac{200}{150}$$

to return the overall loop-gain to $C_0$=200 as desired. In this way, variations in the work function, due to tip shape change or chemistry change or other factors, is compensated by the control systems 200 and 1200. This can be explained by the following adaptation algorithm, which can be implemented as hardware or software, to adjust the integrator gain of the controller based on the measured parameter CG as follows:

$$(K_i)_{new} = (K_i)_{old} * \frac{\text{desired loop gain}}{\text{measured loop gain}(CG)} \quad (19)$$

Figure 13:
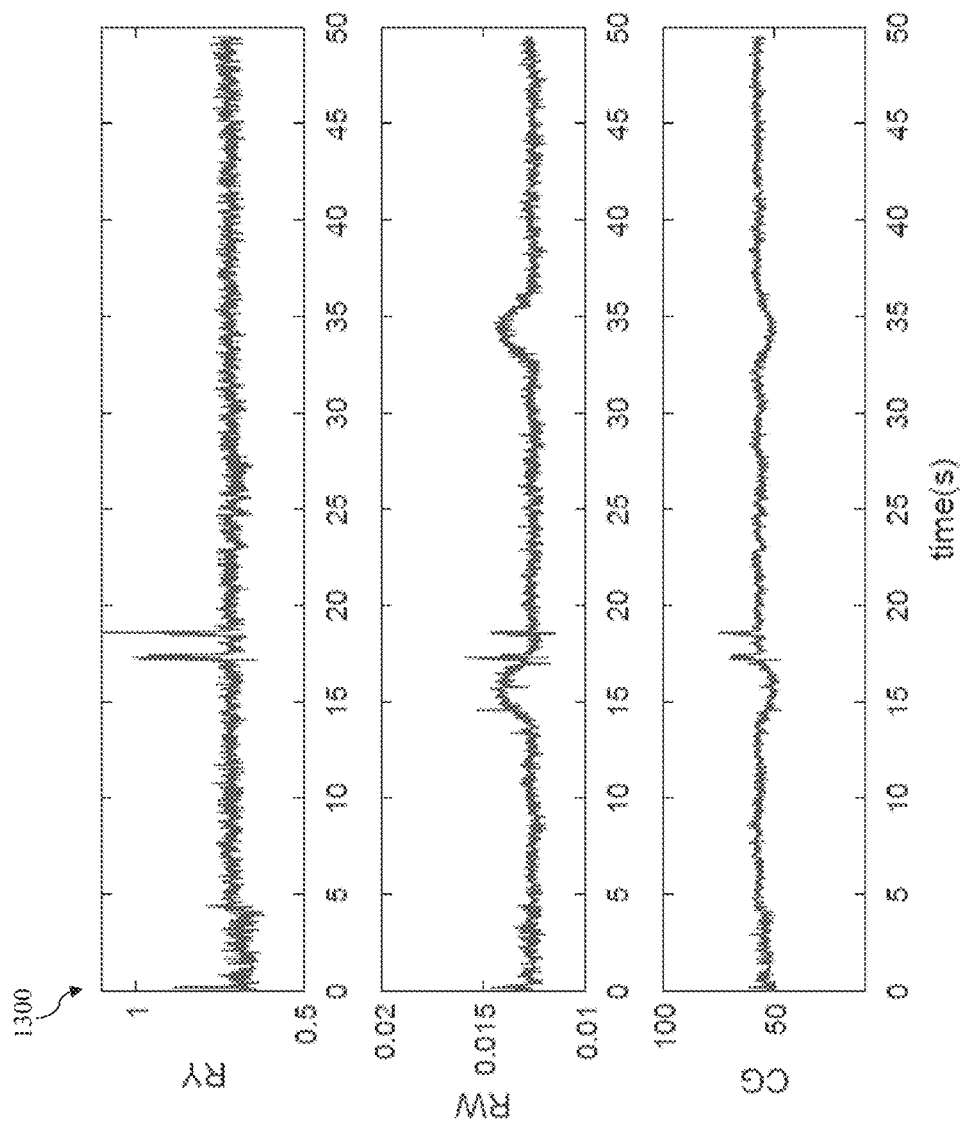
FIGS. 13, 14, 15, and 16 present exemplary experimental outputs from the control system of FIG. 12 according to some embodiments of the present disclosure.

FIGS. 13, 14, 15, and 16 present an exemplary experimental output from the control system 1200, that show changes in the work function CG that occur during operation of an STM system, such as the STM system 100 of FIGS. 1A and 1B. FIGS. 13-16 each include 3 subplots, one for RY, one for RW, and one for CG, which is proportional to the work function. The X-axis of each subplot is time, measured in seconds. The plots 1300 of FIG. 13 display the measured parameters while the STM is idle with low-pass and high-pass cutoff frequencies selected as 15 Hz and 200 Hz, respectively. As seen in FIG. 13, a small increase in work function has happened at time t=4 s. Also, at times t=15 s and t=35 small changes have happened, with recovery in a few seconds. Overall, during this test CG settled around 50.

Figure 14:
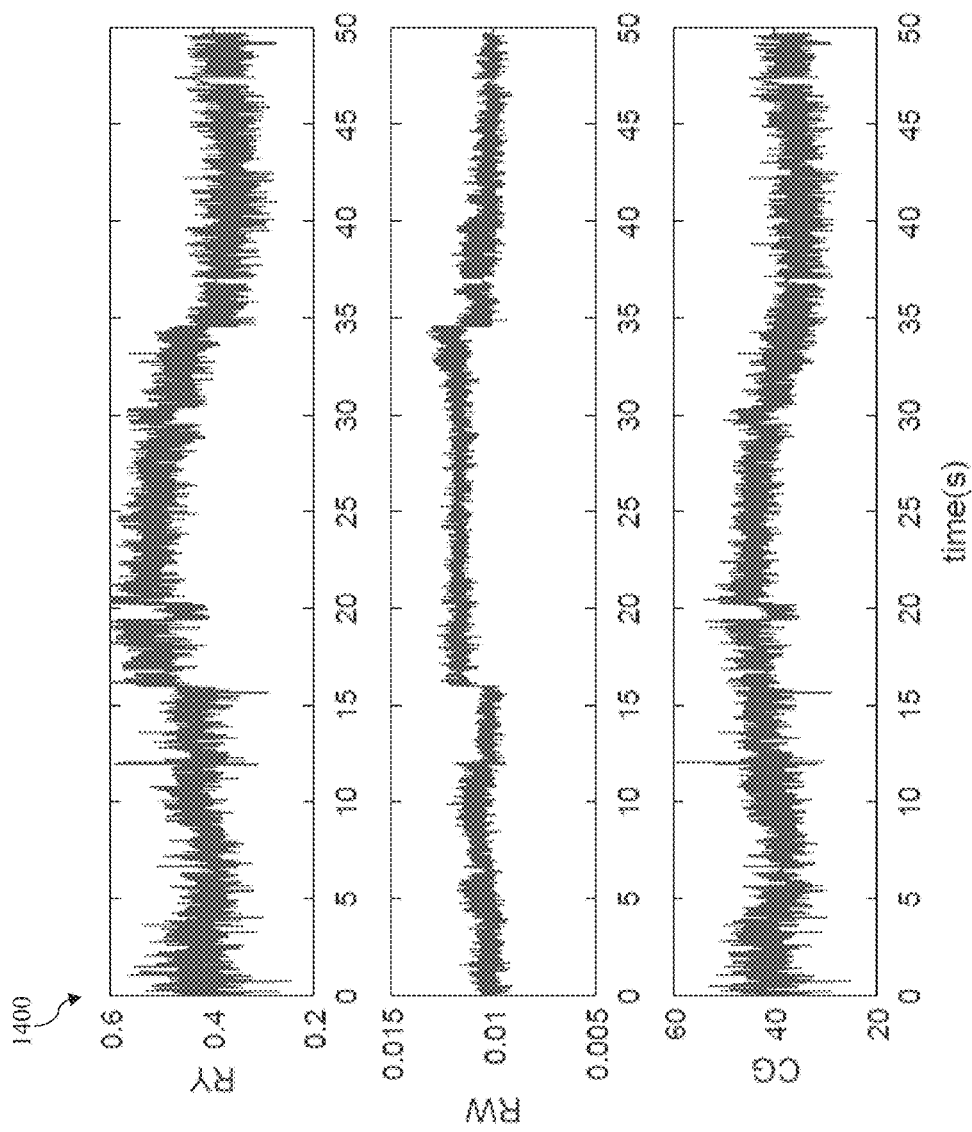

FIG. 14 presents a plot 1400 of the estimated parameters with low-pass filter bandwidth of 30 Hz while the STM system is idle and the integrator gain is increased from 80 to 90, before being set back to 80. As shown in FIG. 14, variation of the controller gain affects RY and RW. However, the estimated value of work function may be independent of controller gain as indicated in equation (18). FIG. 14 depicts that the work function during the test varied slowly, starts from a value near 40, growing up to 50, before returning to around 40. This observation shows that the work function can change slowly while the tip is fixed on a certain point on the sample.

Figure 15:
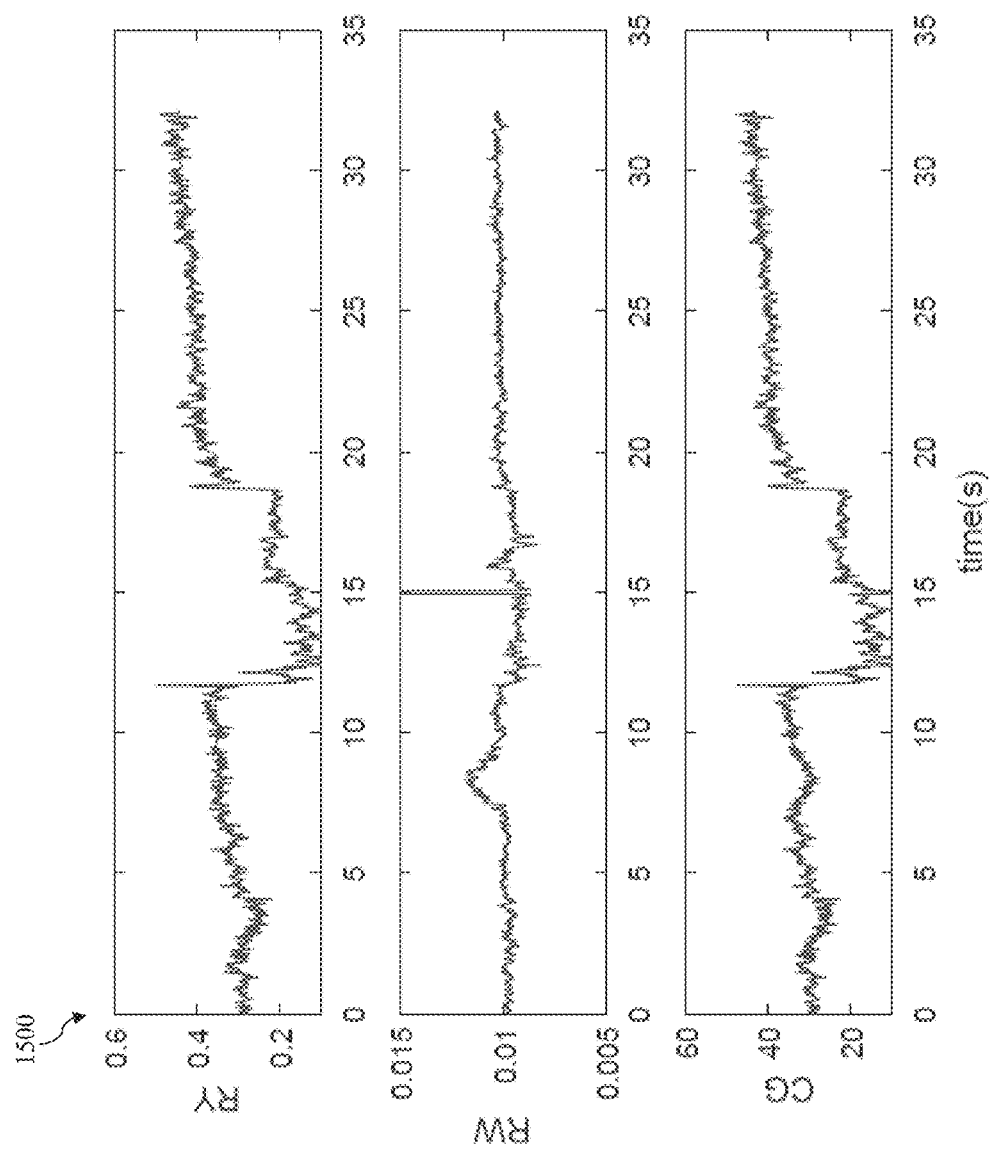

FIG. 15 displays a plot 1500 of a test during which the STM system was idle and bias voltage was suddenly changed for the purpose of tip conditioning. Results show that the work function immediately changed as the bias voltage was changed. FIG. 15 also shows that the work function has an increasing trend during the experiment.

Figure 16:
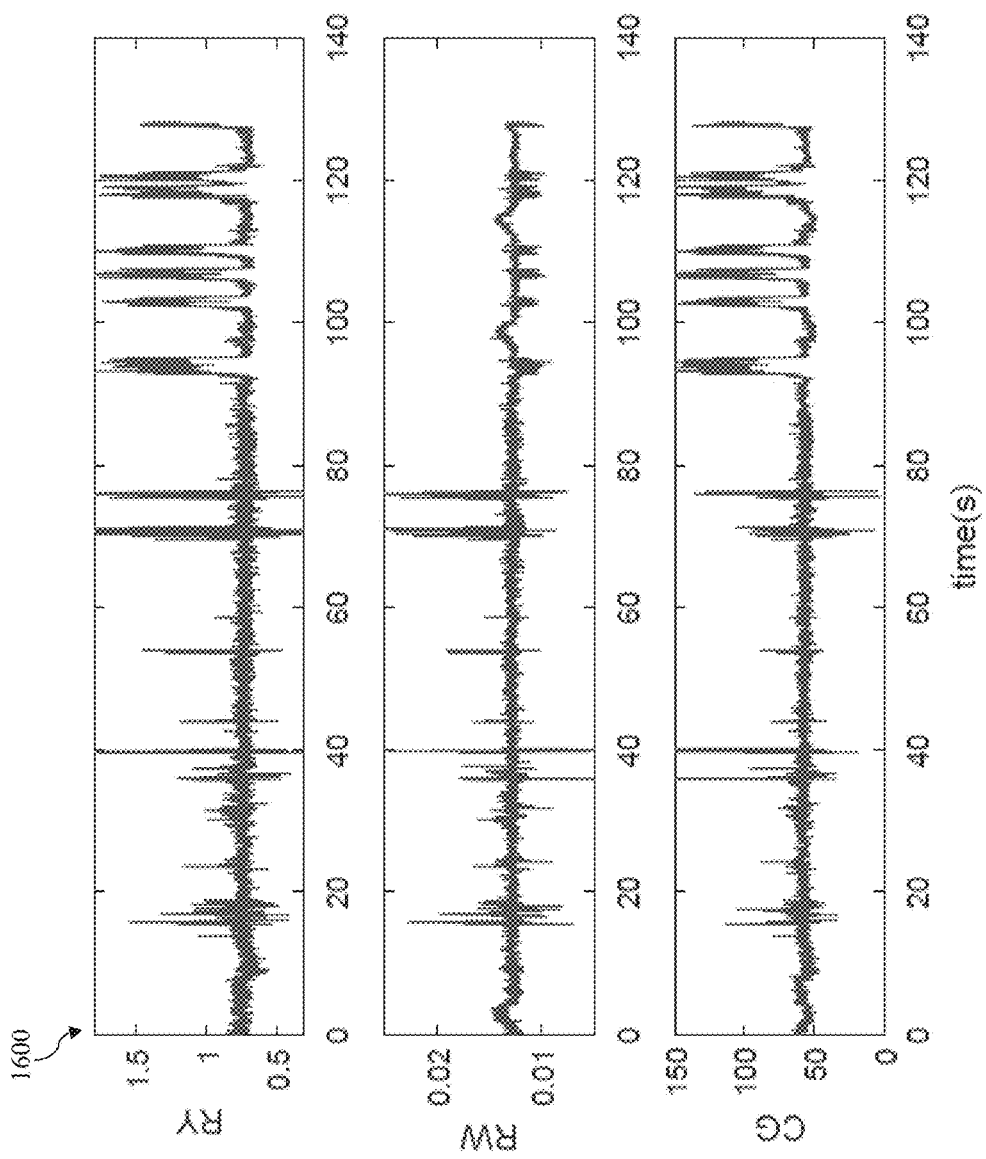

FIG. 16 displays a plot 1600 of test results from an experiment in which the STM system was scanning. FIG. 16 shows that topography may negatively affect the work function estimation. For alleviating this problem while scanning, a smaller cutoff frequency for low-pass filters may be used in some embodiments. In general, comparing the estimation results with the STM image it is observed that any artifact related to tip change in the image is represented by sharp variations in the estimated parameters. For example, the peaks around time t=100 s show a situation in which a tip-change or a work function change temporarily destabilized the control system and 8 kHz resonance has appeared.

Additional experiments showed that moving the tip 104 from a point A on the sample to another point B caused a change in the work function. The work function returned to its previous value when the tip 104 was returned to point A. This indicates that the work function can be significantly different at 2 different points on the sample.

Because the work function can be estimated on the fly by the amplitude estimator 1100 and the control system 200 or in the control system 1200, the work function estimation can be used to provide additional feedback to the controller 212 and/or the plant 222 of FIG. 2. This additional feedback may be received by the actuator 220 and used to further alter the position d of the tip 104. This feedback may be provided to the actuator 220 directly by the control unit 114 or may be injected into the control loop at a different position.

Figure 17:
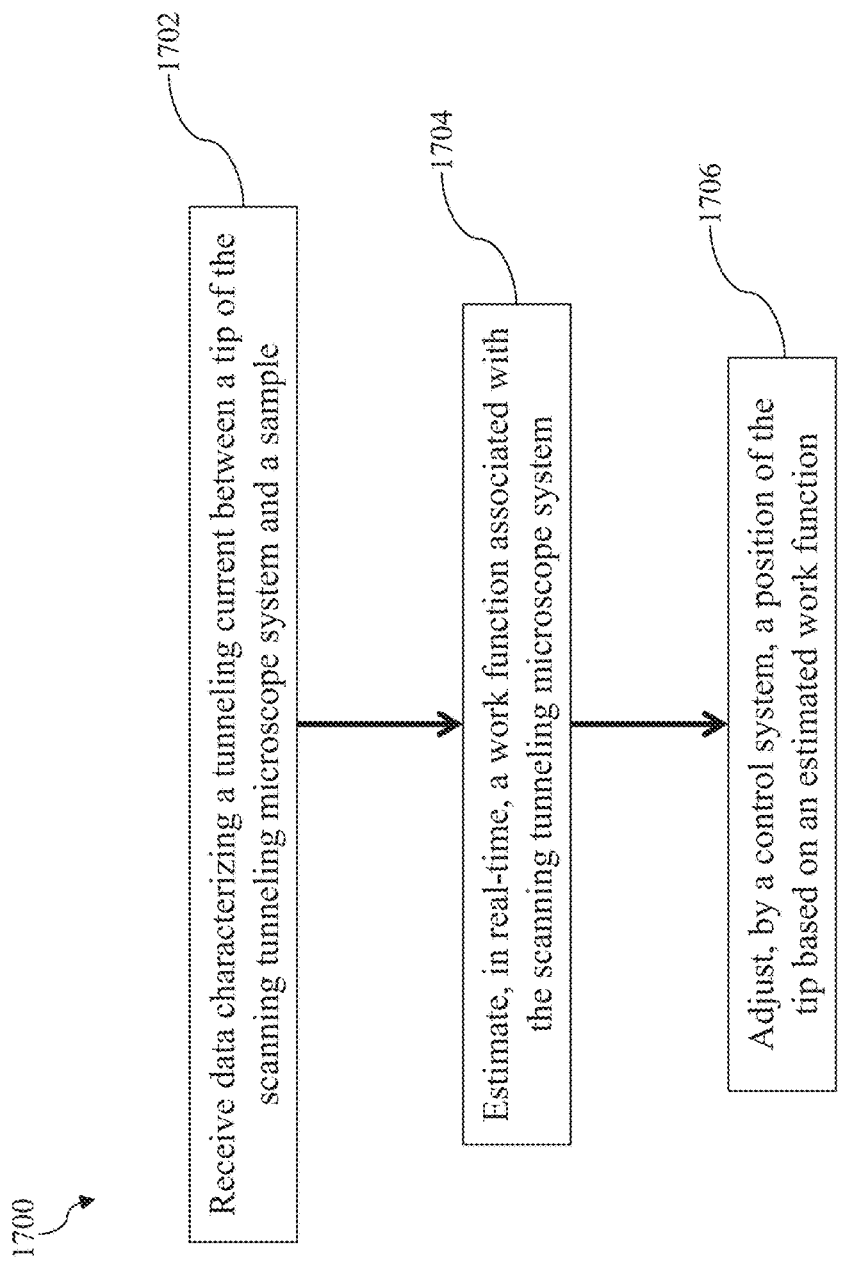
FIG. 17 is a flowchart of a method of controlling a scanning tunneling microscope system according to some embodiments of the present disclosure.

FIG. 17 is a flowchart of a method 1700 of controlling a scanning tunneling microscope system, like the STM system 100 of FIGS. 1A and 1B. As illustrated in FIG. 17, the method 1700 includes several enumerated steps or operations. Embodiments of the method 1700 may include additional steps or operations before, after, in between, or as part of the enumerated operations. Additionally, some embodiments of the method 1700 may not include all of the enumerated operations. The method 1700 may be implemented by the control unit 144 of FIG. 1 or the control systems 200 and 1200. Additionally, some embodiments of the method 1700 may be computer readable instructions or code stored in a non-transitory, tangible computer readable medium.

As illustrated in FIG. 17, the method 1700 may begin at operation 1702 in which a processing device, included in the control unit 114 or implementing the control system 200 of 1200, receives data characterizing a tunneling current between a tip of the scanning tunneling microscope system and a sample. At operation 1704, the processing device may estimate a work function associated with the scanning tunneling microscope system. In some embodiments, the work function may be estimated in real time. At operation 1706, the processing device may adjust a position of the tip based on an estimated work function. The processing device may send one or more commands to the positioning system 300 of FIG. 3 to adjust the position of the tip.

The processing device may implement a closed loop having a gain controller and a plant, as seen in FIG. 1200 and in FIG. 2. The method 1700 may further include operations of introducing a system identification signal into a closed loop of the control system and of filtering an output signal to identify a system identification portion of the output signal. The system identification portion of the output signal may result or be generated at least in part from or based on the system identification signal. In some implementations, the system identification signal has a fixed frequency of 1 kHz. Other implementations may include a system identification signal having a frequency of about 300 Hz or about 700 Hz. The system identification signal may be selectively introduced at a first location in the control system or at a second location in the control system The method 1700 may further include an operation of estimating the work function based on the system identification portion. Adjusting the position of the tip may be performed by actuating a piezoelectric actuator to move the tip along a Z-axis and may be performed to maintains a desired tunneling current between the tip and the sample.

One advantage of the adaptive controller is that it may allow the use of much more aggressive PI parameters. Currently, STM system users often tune down the PI parameters of their systems to avoid oscillations that can arise. With the understanding that at least some of these oscillations arise from work function changes, the use of an adaptive controller, as described here, may permit an STM system user to set these parameters to much higher values. This may result in smaller controller errors, meaning that the tunneling current is much closer to the set-point. Less variation in the tunneling current may also protect the tip from changing.

As described herein, the estimated work function is related to an open-loop gain of the plant. For example, the control system employed or realized by the method 1700 may include an amplitude estimator that determines an open-loop DC gain of the control system, which may be proportional to the work function. The amplitude estimator may include a low-pass filter and a high-pass filter as part of the particular embodiment presented here, which is known as a lock-in amplifier. A narrow band-pass filter having the pass band centered at the frequency of the injected identification signal (e.g., 1 kHz) can also replace the proposed lock-in amplifier, in some embodiments. Additionally, instead of a lock-in amplifier or band-pass filter, other parameter estimation techniques can be used in practicing the methods and in control systems described herein. These techniques include, but are not limited to, state estimators such as a Kalman Filter (KF) or Extended Kalman Filter (EKF) which use a dynamic model of the open-loop system as well as spectral properties of measurement noise to provide an estimation of the model parameter associated with the work function. Also, implementation of a Lyapunov filter, which is an adaptive parameter estimator, is yet another technique for STM work function estimation within the scope of this disclosure.

The approaches presented in this section are based on modulation of the current set-point or the controller command. In some embodiments, it may also be possible to estimate work function by modulating other STM system effective parameters, such as bias voltage, because the work function is dependent on these parameters, too. The approaches presented here are suited to use any number of such parameters, particularly where the relationship between inputs and outputs are close to linear. Since bias voltage appears nonlinearly in the logarithm of current, modulation of bias voltage for work function estimation may utilize additional considerations of nonlinear effects, in some embodiments.

Some embodiments of the method 1700 may further include operations of imaging the surface of the sample with the scanning tunneling microscope simultaneously with the adjusting the position of the tip, of patterning a surface of the sample with the scanning tunneling microscope system while the adjusting the position of the tip is being performed by the control system, and/or of adjusting another parameter of the scanning tunneling microscope system based on the estimated work function. The method 1700 may include determining a parameter space that indicates acceptable parameter ranges.

Embodiments of the present disclosure may provide for real-time work function estimation in a scanning tunneling microscope system. The work function estimation described herein may be utilized in a feedback control loop to tune parameters of a controller that adjusts the position of a scanning tip along the Z-axis. An adaptation module that generates an adaptation signal or feedback signal f(s) is part of the adaptive control scheme which takes advantage of the estimated parameter CG, as well as an embedded open-loop model of the system in order to tune parameters of the feedback controller to ensure stability of the closed-loop system under work function variation. The control loop may provide improved protection against contact or crashes between the tip and a surface being imaged or being written on. While the present disclosure has provided several examples of control systems and methods for may be employed to provide such high-performance control, the scope of the invention is not limited to the explicit examples of the present disclosure. Combinations of features of various examples contained herein may be combined with each other and with other features as may be apparent to one having skill in this art. Accordingly, the scope of the invention is limited only by the following claims.

What is claimed is:

1. A method of controlling a scanning tunneling microscope system, the method comprising:

receiving data characterizing a tunneling current between a tip of the scanning tunneling microscope system and a sample;
estimating, in real-time, a work function associated with the scanning tunneling microscope system; and
adjusting, by a control system, a position of the tip based on the estimated work function.

2. The method of claim 1, wherein the control system comprises a closed loop having a gain controller and a plant.

3. The method of claim 1, further comprising:
introducing a system identification signal into a closed loop of the control system; and
filtering an output signal to identify a system identification portion of the output signal, the system identification portion of the output signal resulting at least in part from the system identification signal.

4. The method of claim 3, further comprising estimating the work function based on the system identification portion.

5. The method of claim 3, wherein the system identification signal has a fixed frequency.

6. The method of claim 3, wherein the system identification signal is selectively introduced at a first location in the control system or at a second location in the control system.

7. The method of claim 1, wherein adjusting the position of the tip comprises actuating a piezoelectric actuator to move the tip along a Z-axis.

8. The method of claim 1, wherein the adjusting the position of the tip maintains a desired tunneling current between the tip and the sample.

9. The method of claim 2, wherein the estimated work function is related to an open-loop gain of the plant.

10. The method of claim 1, wherein the control system comprises an amplitude estimator that determines an open-loop DC gain of the control system, the open-loop DC gain being proportional to the work function.

11. The method of claim 10, wherein the amplitude estimator includes a low-pass filter and a high-pass filter.

12. The method of claim 1, further comprising imaging a surface of a sample with the scanning tunneling microscope simultaneously with the adjusting the position of the tip.

13. The method of claim 1, further comprising patterning a surface of the sample with the scanning tunneling microscope system while the adjusting the position of the tip is being performed by the control system.

14. The method of claim 1, further comprising adjusting another parameter of the scanning tunneling microscope system based on the estimated work function.

15. The method of claim 1, determining a parameter space that indicates acceptable parameter ranges.

16. A system for interacting with structures on a sample, the system comprising:
a scanning tunneling microscope having a tip;
a positioning system configured to precisely control movement of the tip of the scanning tunneling microscope relative to the sample; and
a control unit in communication with the scanning tunneling microscope and the positioning system, wherein the control unit is configured to:
receive data characterizing a tunneling current between a tip of the scanning tunneling microscope and a sample;
estimate, in real-time, a work function associated with the scanning tunneling microscope; and
adjust a position of the tip relative to the sample based on the estimated work function.

17. The system of claim 16, wherein the control unit comprises a closed feedback loop.

18. The system of claim 16, wherein the control unit is further configured to:
introduce a system identification signal into a closed loop of the control unit; and
filter an output signal to identify a system identification portion of the output signal, the system identification portion of the output signal resulting at least in part from the system identification signal.

19. The system of claim 18, wherein the control unit is further configured to estimating the work function based on the system identification portion.

20. The system of claim 18, wherein the system identification signal has a fixed frequency.

21. The system of claim 18, wherein the system identification signal is selectively introduced at a first location in the control unit or at a second location in the control unit.

22. The system of claim 16, wherein the control unit is further configured to adjust the position of the tip by actuating a piezoelectric actuator of the positioning system to move the tip along a Z-axis.

23. The system of claim 16, wherein the control unit is configured to adjust the position of the tip relative to the sample based on the estimated work function so that the position maintains a desired tunneling current between the tip and the sample.

24. The system of claim 16, wherein the control unit comprises an amplitude estimator that determines an open-loop DC gain of a control unit implemented by the control unit, the open-loop DC gain being proportional to the work function.

25. The system of claim 24, wherein the amplitude estimator includes a low-pass filter and a high-pass filter.

26. The system of claim 16, wherein the control unit is further configured to collect imaging data characterizing a surface of the sample with the scanning tunneling microscope while adjusting the position of the tip.

27. The system of claim 16, wherein the control unit is further configured to pattern a surface of the sample with the scanning tunneling microscope while the position is adjusted by the control unit based on the estimated work function.

28. The system of claim 16, wherein the control unit is further configured to adjust another parameter of the scanning tunneling microscope based on the estimated work function.

29. The system of claim 16, wherein the control unit determines a parameter space indicative of acceptable parameter ranges.

* * * * *